United States Patent [19]

Maecker

[11] 4,384,333
[45] May 17, 1983

[54] CONTROL SYSTEM FOR CRANKSHAFT MILLING AND GRINDING MACHINES

[75] Inventor: Kurt Maecker, Munich, Fed. Rep. of Germany

[73] Assignee: GFM Gesellschaft fuer Fertigungstechnik und Maschinenbau, Steyr, Austria

[21] Appl. No.: 279,041

[22] Filed: Jun. 30, 1981

Related U.S. Application Data

[63] Continuation of Ser. No. 41,248, May 21, 1979, abandoned.

[30] Foreign Application Priority Data

May 22, 1978 [DE] Fed. Rep. of Germany ....... 2822346

[51] Int. Cl.$^3$ ............................................. G06F 15/46
[52] U.S. Cl. ................................ 364/474; 51/165.71; 82/9; 318/571
[58] Field of Search ................ 364/474, 475, 167–171; 29/6; 82/2.5, 3, 9, 20, 2 B; 51/736 C, 165.71, 165 R, 165.72; 408/3, 12; 409/193, 197, 200, 80; 318/39, 571

[56] References Cited

U.S. PATENT DOCUMENTS

| | | | |
|---|---|---|---|
| 2,942,526 | 6/1960 | Maecker | 409/193 |
| 3,880,025 | 4/1975 | Kralowetz et al. | 364/474 |
| 3,919,614 | 11/1975 | Wespi | 51/165 R X |
| 3,970,830 | 7/1976 | White et al. | 51/165.71 X |
| 4,005,552 | 2/1977 | Hoglund et al. | 51/165.72 X |
| 4,122,634 | 10/1978 | Nishimura et al. | 51/165.71 |

FOREIGN PATENT DOCUMENTS 2000610  1/1979  United Kingdom ................ 409/80

*Primary Examiner*—Joseph F. Ruggiero
*Attorney, Agent, or Firm*—Michael J. Striker

[57] ABSTRACT

A control system for a crankshaft-milling or grinding machine having a milling carriage movable in a plane perpendicular to the longitudinal axis of the crankshaft to be machined. A pulse-generating rotary transducer coupled to the workpiece spindle supplies pulses to a computer to indicate both rotary speed and angular position, the computer issuing the requisite control data. The computer is fed pictorial or construction-point data concerning crank pins and crank webs of arbitrary configuration, the computer issuing the requisite control data for feed speed and position after it itself has calculated such data, the data being issued with a clocking rate and updated at such clocking rate at a frequency corresponding to the required degree of dimensional accuracy.

6 Claims, 21 Drawing Figures

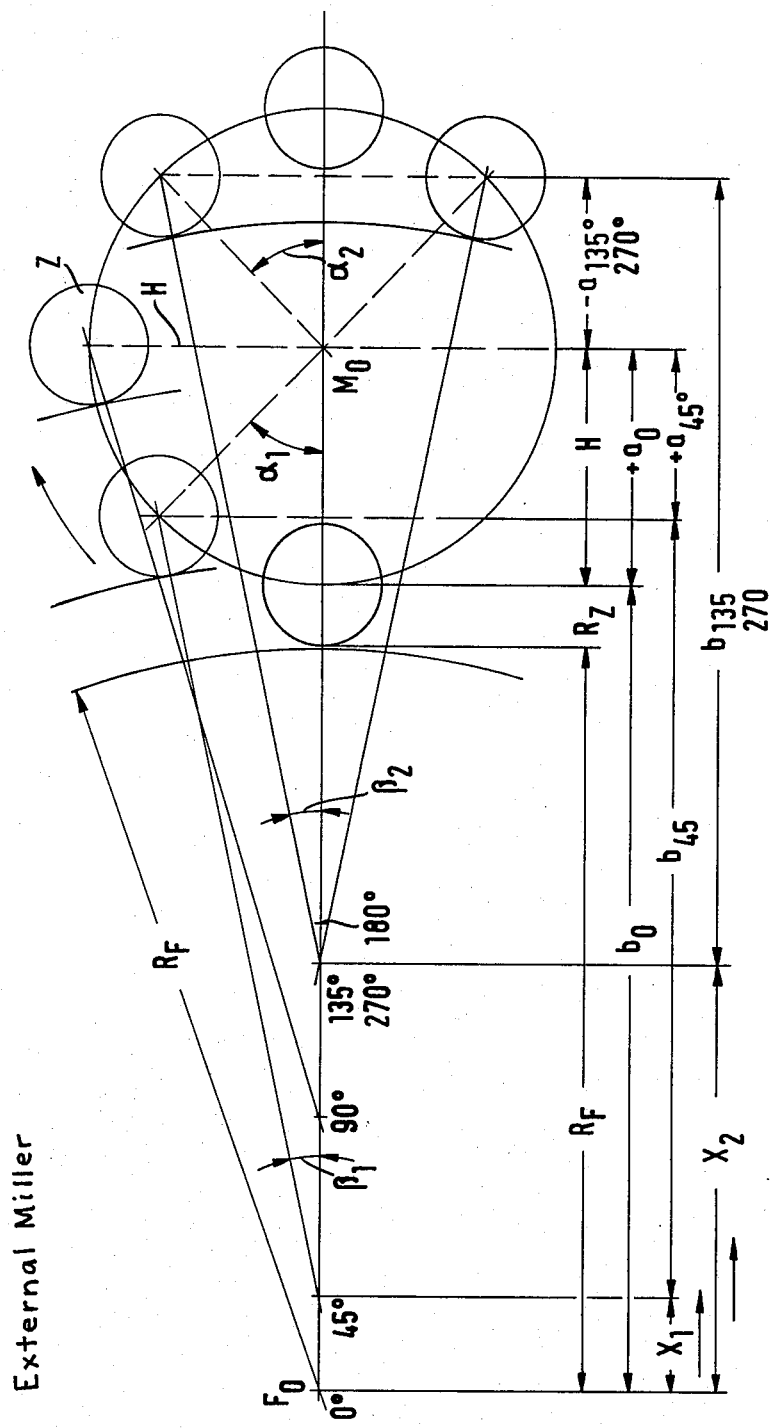

Speed $\pm V_{xn}$ mm/s
Multiplication and Issuance with Clock ta and $Imp_C$
Transmission of $Z10_n$ terms to $Multi_1$ at Clock Rate $T_1$

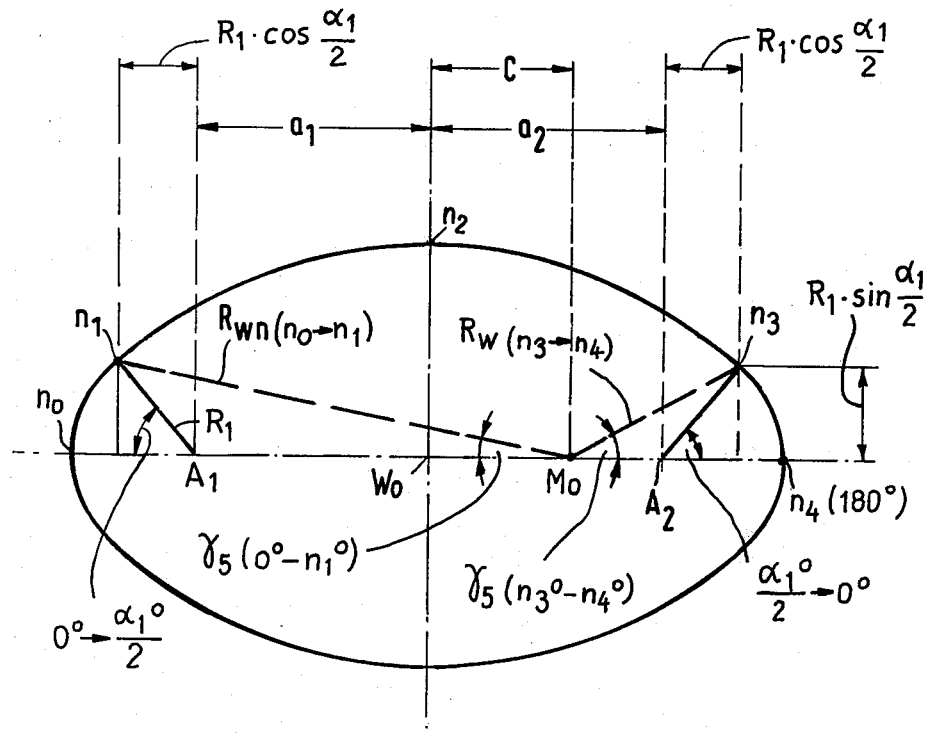
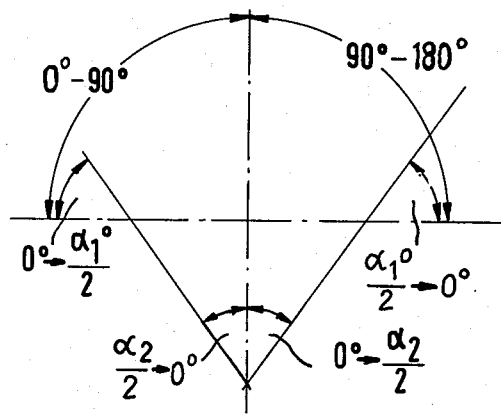

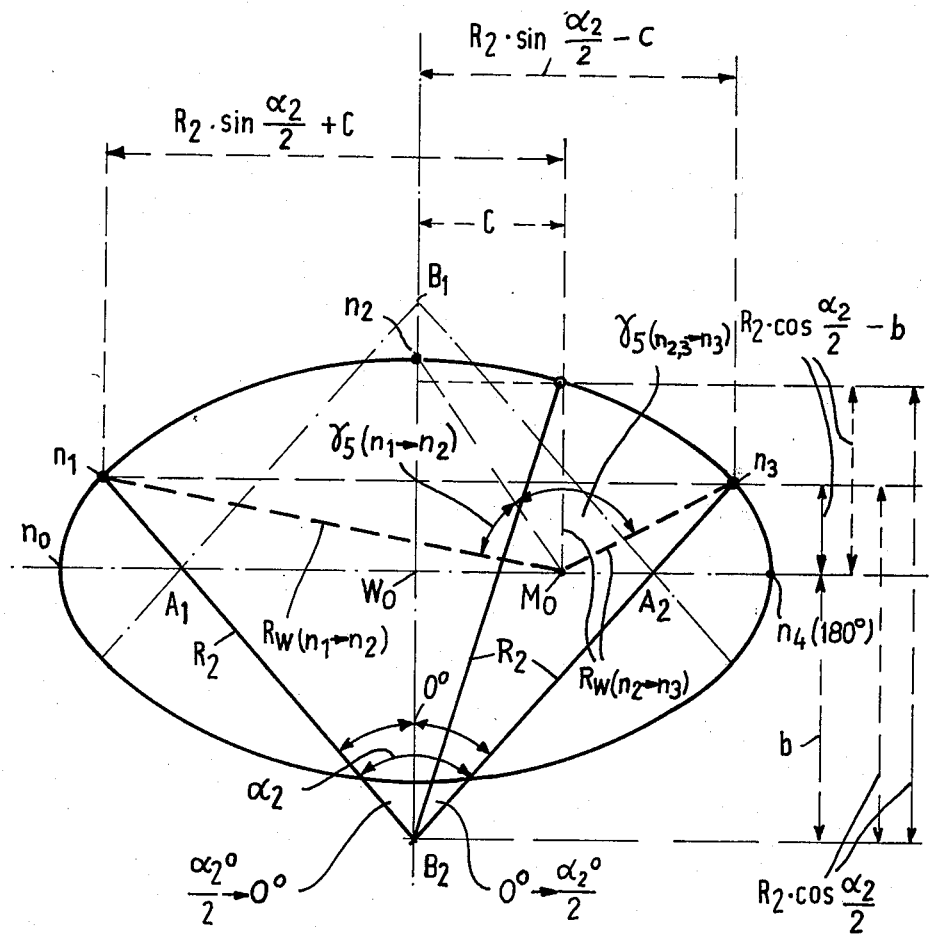
Transformation from $R_2$ to $R_{wn}$     FIG. 4c

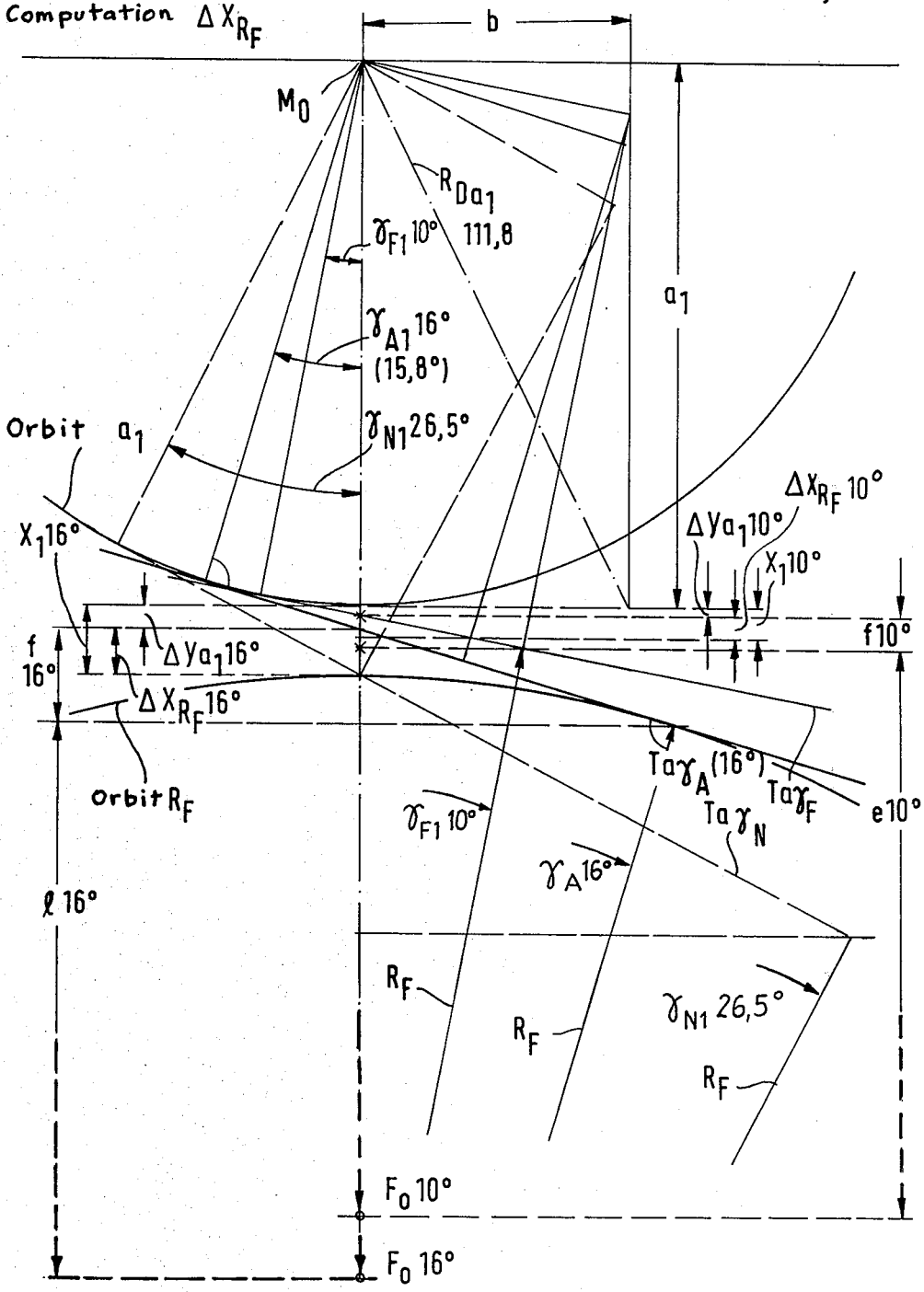

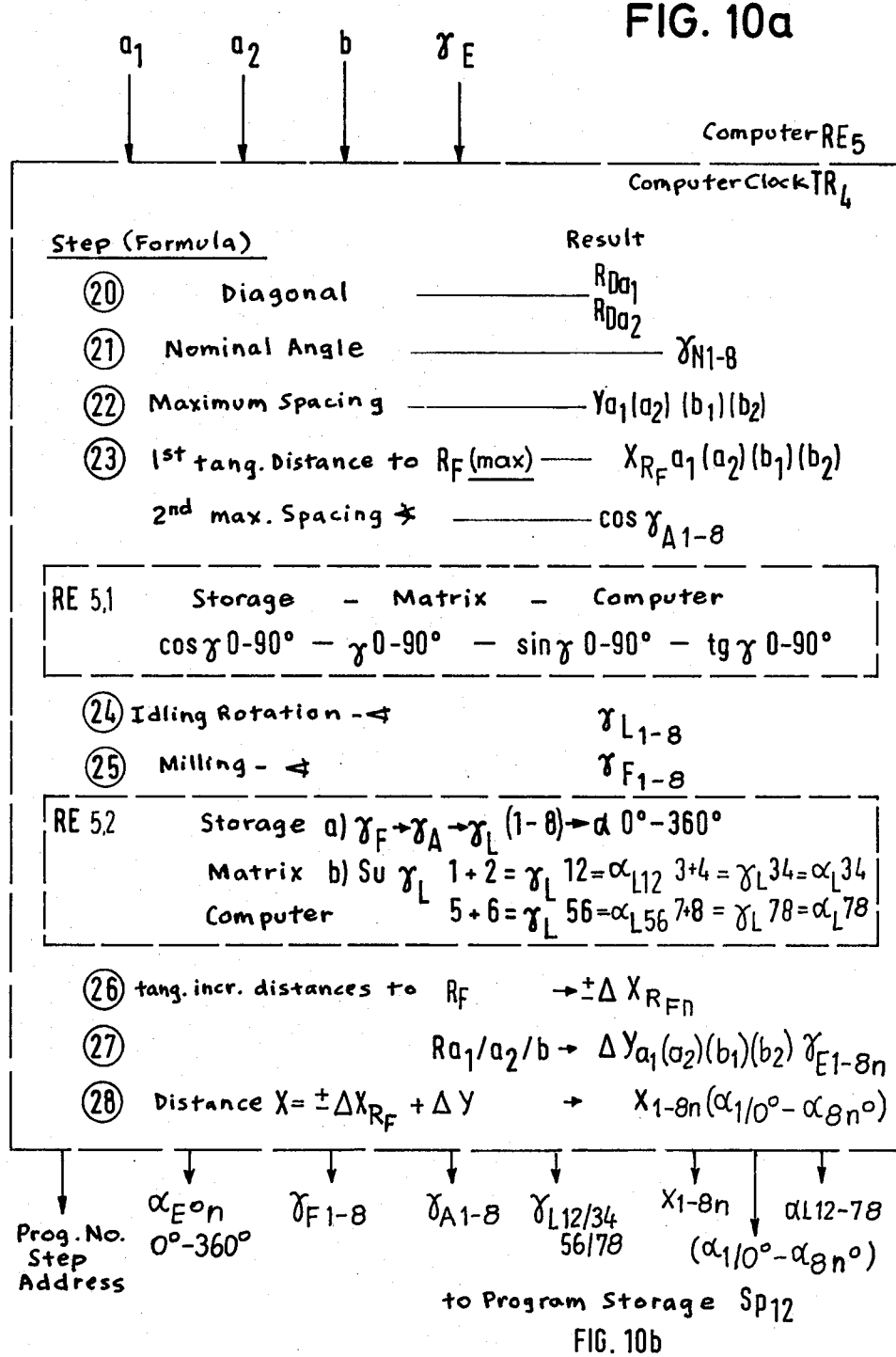

Program Storage Sp$_{12}$                          FIG. 10b

| 1 | 2 | 3 | 4 | 5 | 6 | 7 | 8 | 9 | 10 |
|---|---|---|---|---|---|---|---|---|---|
| Pos | Dest. α 0-360° | ⊲γ$_F$° | ⊲γ$_A$° | ⊲γ$_L$° | Kom.: Axis C | Kom. X St=Stop | X$_n$ | α$_{1-8n}$° | α$_L$° |
| 15/0 | 000,0 | | 00,0 | | | | | | |
| 14 | 360,0 344 | | 15,8 | | C$_F$ | X | X$_{8n}$ | α$_8$ 360° 344° | |
| 13 | 344, | | | 37° | C$_E$ | St | | 307° | α$_{L78}$ |
| 12 | 307 270 | | 36,7 00,0 | | C$_F$ | X | X$_{7n}$ | α$_7$ 270° | |
| 11 | 270 241 | | 00,0 28,5 | | C$_F$ | X | X$_{6n}$ | α$_6$ 241° | |
| 10 | 241 | | | 41° | C$_E$ | St | | 200° | α$_{L56}$ |
| 9 | 200 180 | | 19,5 00,0 | | C$_F$ | X | X$_{5n}$ | α$_5$ 180° | |
| 8 | 180 160 | | 00,0 19,5 | | C$_F$ | X | X$_{4n}$ | α$_4$ 160° | |
| 7 | 160 | | | | C$_E$ | St | | 119° | α$_{L34}$ |
| 6 | 119 90 | | 28,5 00,0 | | C$_F$ | X | X$_{3n}$ | α$_3$ 90° | |
| 5 | 69 | (21,8) 21,0 | 00,0 | | C$_F$ | | | | |
| 4 | 53 | | 36,7 | | C$_E$ | X | X$_{2n}$ | α$_2$ 53° | |
| 3 | 53 | | | 37° | C$_E$ | St | | 16° | α$_{L12}$ |
| 2 | 16 10 | (9,5) 10,0 | 15,8 | | C$_E$ | | | α$_1$ 10° | |
| 1 | 9 1 | | 1 | | C$_F$ | X | X$_{1n}$ | α$_1$ 3° 2° 1° | |
| 0 | 000,0 | - | 00,0 | - | - | St | - | - | - |

α$_{E·n}$ (RE5)  
Clock T$_3$ (RE6)  
γ$_F$ 0-360°Commd. (v.RE5)  
γ$_A$ (v.RE5)  
γ$_L$  
C$_E$,C$_F$ W.Sp.(4)  
X,St F,S(12)  
X$_n$  
α$_{1-8n}$ x$_{1-8n}$ (v.RE5)  
α$_{L12-78}$ (z.RE6)

CONTROL SYSTEM FOR CRANKSHAFT MILLING AND GRINDING MACHINES

This is a continuation of application Ser. No. 041,248, filed May 21, 1979, abandoned.

BACKGROUND OF THE INVENTION

The present invention concerns control systems for crankshaft-milling and -grinding machines of the type provided with a milling carriage movable in a plane which is normal to the longitudinal axis of the crankshaft to be machined. The rotary movement of the workpiece spindle, i.e. its rpm and its angular position, is transformed into longitudinal motion of the milling carriage, the values for speed and position being issued on a digital basis and the operation of the drive for the milling carriage being controlled and regulated by these values by resort to a technique involving an automatic spaced adjustment and position-monitoring and the comparison between commanded and actual values.

With this known type of system, use is made of a mechanical template which serves, in effect, as part of a measuring system for translating the rotary motion of the workpiece into the feed motion of the milling carriage.

The great disadvantage of this arrangement resides in the fact that the production of the template must be performed with the highest degree of accuracy, if the crankshaft ultimately produced is to have the high degree of dimensional exactness required for accurate operation of the cylinders of the combustion machine to be provided with such crankshaft. The accuracy required is down to hundredths of a millimeter.

A further disadvantage of the known system is that the system is tied to the dimensions and configuration of the template employed. Accordingly, when a crankshaft of even minutely different dimensions and/or configuration is to be produced, an entirely new such template must first be prepared. The multitude of different crank web configurations which may be required at different times necessitates considerable expense and inconvenience for keeping in stock a corresponding number of templates and providing an adequate filing system so that a particular template can when needed be located, such template being, quite typically, almost indistinguishable from many other such templates kept in stock.

Lastly, it is necessary that the mechanical part of the feeler device on the template carriage have a radius equal to that of the miller and a breadth equal to the maximum crank throw ever to be implemented.

SUMMARY OF THE INVENTION

It is an object of the invention to replace such templates with a system not exhibiting these disadvantages, and to improve and increase the accuracy of the machining performed upon the workpiece, upon which of course depends the quality of the crankshaft produced and, indeed, whether it can be used at all.

The accuracy of the machining of the workpiece is furthermore imperiled by the fact that, due to variations in the material of the workpiece, and due to wear of the cutting element(s) of the machine, the effective radius of the milling action frequently changes during the machining of one workpiece. Also, the workpiece often bows under load, so that a continual compensatory correction for the crank-pin diameters must be performed on the machine.

It is another object of the invention to avoid these disadvantages.

In accordance with the present invention, there is associated with the milling carriage a computer to which is fed pictorial or construction-point data for crank pins and crank webs of freely selected configuration, with the computer continually receiving pulses dependent upon the rotary motion of the workpiece spindle from a digital transducer coupled to the workpiece spindle, with the computer itself calculating all the speed and position control data needed for the machining of the crank pins and crank webs, and with this control data being transmitted to control components with a degree of dimensional resolution and with a degree of temporal resolution (i.e., the rate at which control data is from one instant to the next varied) corresponding to the machining accuracy needed for the particular crankshaft to be produced.

The inputting of pictorial data into the computer can be performed by means of manual input or using tape.

By thus dispensing with the mechanical template, this in itself avoids the various disadvantages inherent with such templates.

Likewise, with the inventive system, the production of brand new templates is not needed even when changing over to crank-web configurations of completely different configuration or to entirely different overall dimensions for the crankshaft. It is merely necessary to feed into the computer the corresponding new pictorial or construction-point data, and furthermore without the need for complicated preliminary calculations previous to doing so.

In an earlier patent application Ser. No. 558,193, filed Mar. 13, 1975 abandoned by the same inventive entity, there was described a control system for crankshaft-milling machines in which the usual mechanical template was already in that system replaced by a computer. However, the system there disclosed involved a crankshaft-milling machine in which the workpiece was never moved at all during the entirety of the crankshaft-milling work. In this way, it was possible to avoid the expensive drive arrangement which would be required if the workpiece were to be moved during milling and likewise the costly indexing system which would be needed. This furthermore made possible a reduction in the number of distinguishable individual constituent milling operations to be calculated by the computer to such a degree as to actually make feasible, for the first time, the numerical control of crankshaft-milling action so long sought in the art.

However, this known machine must operate with a transverse carriage, as a result of which its utility is limited to particular workpiece sizes and shapes, because for certain workpiece sizes and shapes the transverse carriage would become excessively costly due to its required volume and weight, i.e., from the entirely practical viewpoint. Furthermore the miller must, due to the length of the workpiece, be disposed vertically. Because such machine can only operate economically when an internal miller is employed, when larger millers are employed, e.g., having a diameter of 1000 mm, and including the internal-miller ringgear drive mechanism, it becomes necessary to employ an extremely large vertical carriage provided with correspondingly broad and tall guidance means, such as a portal.

With the machine of that prior application, use is made of a transverse carriage and the workpiece, which never moves at all during the entire milling operation, is milled under the control of a system operating on the basis of both straight-line and circle interpolation. In contrast, the milling machine used in accordance with the present invention need perform only straight-line motions and follows the rotating workpiece. Accordingly, the miller can be an ordinary cutter head with externally disposed cutting elements, by means of which the crank pins and webs can nevertheless be machined no matter what configuration they are to have.

Indexing of the workpiece is simple with the type of construction employed in the present invention, because the drive for the workpiece spindle can be brought to the next machining angle directly by relying on the digital transducer associated with the workpiece spindle.

In contrast to the system of the earlier application, the computer employed in the system of the present invention continually reacts to the signals produced by the workpiece-spindle transducer (rotary speed and angular position) and calculates from those the correct feed increments and the requisite operating directions for the milling carriage.

Federal Republic of Germany published patent application DE-OS No. 2 654 949 discloses a crankshaft-milling machine comprising the following components:

a motor which rotates the workpiece about the longitudinal axis of the workpiece and provided with a pulse generator producing pulses corresponding to rotation of the motor, three counters connected in chain-form to this pulse generator, a further motor for shifting the cutting tool in the direction perpendicular to the longitudinal axis of the workpiece, a servoamplier which receives a signal from a control circuit and drives the second motor in accordance therewith, and a further pulse generator producing pulses corresponding to the rotation of the second motor, the further pulse generator being so connected in circuit as to transmit the pulses it generates to the servoampliifer as a feedback signal.

In contrast to the inventive system, the computer used to control the machine in DE-OS No. 2 654 949 is only fed externally and previously calculated commands dictating in themselves the particular feed increments and workpiece-spindle rotary movements to be performed, i.e., does not receive merely raw pictorial or construction-point data concerning the dimensions and configuration of the crankshaft to be produced; also that system does this without two-way monitoring action. The computer does establish a correlation between these specific commands and the rotary motion of the workpiece, but this likewise occurs without any negative-feedback monitoring action. For example, when a particular angular position is commanded, there is no positive ascertainment that this commanded position has in fact been achieved.

Furthermore, and in contrast to the present invention, the system of the aforementioned German patent publication operates only on the basis of position information. Regulation of speed is not afforded. The speeds of operation are instead permitted to establish themselves, in an uncontrolled and uncontrollable manner, as a mere incident to the position data with reference to which the system operates. This is particularly disadvantageous at points in the milling operation where zero velocity is encountered. With the known machine, use is made of the well known crankshaft formula, for establishing the functional relationship between workpiece rotation and milling carriage motion. In accordance with such formula, the milling of a crank pin, as translated into the motion performed by a crankshaft during its actual use, involves the fact that, even with a constant orbital speed, the speed of feed assumes the value zero at the two reversal points 0° and 180°. If the crank web is oval, there actually result four such reversal points.

When, in the manner of that prior-art system, use is made of position regulation exclusively, the system goes into a state of ambiguous or indefinite milling operation in the vicinity of each such direction reversal. This is because, even when one is milling a relatively large crank pin with, e.g., a pin radius of 38 mm and a crank throw of 62.5 mm, in the angular region from $\pm 0°$ to 1° the individual increments amount to only 0.00016 mm, and only amount to 0.00041 mm in an angular region from $\pm 1$) to 2). I.e., a negative-feedback control system operating with a conventional resolution of 0.01 mm in its feedback or actual-value transducer would not even respond to the conditions prevailing until the angular region from $\pm 1°$ to 2° is reached.

Accordingly, with the prior-art machine, the distance increments $\Delta Y$ assume very considerably differing values depending upon what angular position is involved, e.g., lower than 0.001 mm from 0° to 4° and more than 0.04 mm from 80° to 90°.

In contrast, by means of the speed schedule and speed regulation of the present invention, continuous control of motion is achieved even at the smallest feed increments. For example, with a crank shaft produced in accordance with the following data
miller radius $R_F = 150$ mm
crank pin radius $R_Z = 38$ mm
crank throw $H = 62.5$ mm,
a milling carriage motion increment of only 0.013 mm is achieved at the workpiece angular region 0°–1°. This, in turn, at a workpiece-spindle rotary speed of 1 rpm (one rotation per minute) corresponds to a speed $V_x$ 1° of 4.68 mm/min. Furthermore, in accordance with the inventive calculation of the feed speed of the milling carriage, detection of the dynamics of the workpiece spindle is performed recurrently at very short time intervals.

With the system of the present invention, at certain distances determined by the permitted tolerance range employed, there is performed monitoring and correction of the exact position of the milling carriage, with the computer which controls the milling carriage calculating and issuing all the control commands needed for the milling of the crank pins and webs, no matter what the configuration to be implemented, after it has been fed the normal pictorial data for the workpiece and in dependence upon the pulses produced by the workpiece-spindle transducer.

In order to calculate the speeds $V_{xn}$, the computer is, in accordance with a further feature of the invention, so set up that, after input of the workpiece data or construction-point data, it perform all the computations dependent upon a unit-angle and associated thereto, store the results, and then enable the system for operation when all starting computations and conditions have been finished and met; and then repeatedly and with extremely brief intervals between updatings, multiply these results with the number of pulses produced by the workpiece-spindle transducer during each interupdating time interval and then convert this resultant into a command voltage which serves then to control the actual drive of the milling carriage.

In that way, even if the rotary speed of the workpiece spindle is constant, the feed speed will continually change and reach its maximum value at an angular position between 73° and 75°.

In accordance with a further feature of the invention, the control circuitry is so designed that the system's clock signal ta is transmitted, along with the next pulse from the workpiece-spindle pulse generator, to the inputs of an AND-gate, the output signal of the AND-gate effecting the transmission of the count on a counter which counts these pulses to a multiplier, and then thereafter setting such counter to zero.

It has been found that, with a permissible tolerance of less than 0.01 mm, it suffices to calculate the speed $V_x$ in the form of an average speed for predetermined unit-angle sections of the workpiece spindle C.

Because the increment X of the milling carriage must be calculated as a preliminary to each monitoring of position—which, as already indicated, is likewise to be performed each time the workpiece has run through a certain angle—, there results the following simple formula for speed:

Formula [1]
$$V_x = n_c \cdot \frac{360}{\alpha_E} \cdot X_{n+1} - X_n \text{ in mm/min}$$

wherein
$n_c$ = the rotary speed of the workpiece spindle C
$\alpha_E$ = the selected intercalculation interval
$X_n$ = the feed distance corresponding to the rotation angle $\alpha_n$ of the workpiece spindle C.

This feed distance X is converted, in accordance with the conventional crankshaft formula, into the terms of the milling performed by the crankshaft-milling machine described above and computed in accordance with the formula:

Formula [2a] for external miller
$$X = (R_F + R_Z + H) - H\left[\pm\cos\alpha_n + \sqrt{\left[\frac{R_F + R_Z}{H}\right]^2 - \sin^2\alpha}\right]$$

Formula [2b] for internal miller
$$X = (R_F - R_Z + H) - H\left[\pm\cos\alpha_n + \sqrt{\left[\frac{R_F - R_Z}{H}\right]^2 - \sin^2\alpha}\right]$$

wherein
$R_F$ = the radius of the miller
$R_Z$ = the radius of the crank pin
H = the throw of the crankshaft.

For the speed $V_x$, there is inserted into formula [1], instead of the rotary speed $n_c$, the number of pulses produced per second by the digital rotary transducer (DGC 4.3) with which the workpiece spindle C is provided. Expressed in mm/sec, this results in the formula:

Formula [3]
$$\pm V_x = Imp_c/s \cdot \left[\frac{1.360}{Imp_c Um \cdot \alpha_E} \cdot \pm\Delta X_n\right] \text{ mm/s}.$$

in which $Imp_c/Um$ = the number of pulses produced per rotation of the rotary transducer (DGC 4.3)

$$\pm\Delta X_n = X_{n+1} - X_n$$

The expression in brackets, hereafter denoted as expression Z $8_n$, can be calculated in advance for each crank pin and for each angular position $\alpha_{En}$ and stored. The expression Z $8_n$ can then be read out from the storage practically instantly, in order to yield the value $V_{xn}$ by simple multiplication with $Imp_c s$:

Formula [3.1]
$$\pm V_{xn} = Imp_c/s \cdot \pm Z\ 8_n.$$

The number of pulses produced per second depends upon the rotary speed of the workpiece spindle and upon the number of pulses produced per single rotation of the workpiece-spindle pulse transducer. The pulses produced by the workpiece-spindle transducer go into the calculations needed for the production of crank pins and webs both in terms of frequency and considered as a sum. Accordingly, the number of pulses produced per rotation, which is to say the resolution implied by the number of divisions within 360°, depends not only on the desired accuracy of the milling-carriage feed distance (highest possible frequency at zero-speed locations), and instead it is also advantageous to provide a high resolution for the accurate indexing of the workpiece prior to actual milling (the next pin in the horizontal position towards the miller's middle).

With high-speed (ca. 2 revolutions/minute) smaller machines, and with crank throws up to a maximum of 100 mm, it suffices to perform an X-position updating, i.e., a calculation of a new value in accordance with formula [2], once per degree, i.e., after 1°, after 2°, after 3°, etc.

With larger machines, for crank throws of 100–250 mm, and with rotary speeds up to 0.1 rotations/minute or less, it is advantageous to perform an X-position updating after every 0.5° of rotation. When milling merely to round off the edges of crank webs, for which looser tolerances are permitted (0.1 mm), X-position updating can be performed every 5° with larger unit-angles $\alpha_E$.

During the milling of the crankshaft, for each unit-angle increment the corresponding number Z $8_n$ is read out. When this is then multiplied by the frequency term $Imp_c/s$ in accordance with formula [3.1] (pulse transducer DGC 4.3), the result is the feed speed in mm/s.

Now, the time required for a workpiece-spindle rotary-angle increment of one degree
at 0.01 rpm = 16.66 seconds
at 2 rpm = 0.083 seconds.

Within time intervals of these durations, variations can develop in the repetition frequency of the pulses produced by the workpiece-spindle pulse transducer, for example resulting from load fluctuations; and the automatic calculation of command data, if only performed once per 1° angular increment, would not be able to take these variations into account. This is because the value $Imp_C/s$ goes into formula [3] in the form of an instantaneous value, i.e., as the sum or total of the pulses produced during the preceding angular increment $\alpha_{En}$, in no way yet taking into account the next angular increment $\alpha_{En+1}$.

Therefore, according to a further feature of the invention, utilizing a clock signal ta, the calculation expressed in the next-following formula [4] (which is a multiplication of two numbers, each of which has at most four places) is repeated at extremely short intervals, so many per second as to take into account the dynamic behavior of the workpiece spindle within the course of each individual angular increment. Of course, it is nevertheless always the instantaneous frequency of the pulses produced by the digital transducer (DGC 4.3) which goes into this repeated computation. For manufacturing tolerances lower than 0.01 mm it suffices to employ a clocking rate ta=0.01 sec. However, for this simple multiplication, a higher clocking rate of 0.001 sec. could be practically implemented.

There results a formula for $V_x$ as follows:

Formula [4]

$$\pm V_x = Imp_c^* \cdot \left[ \frac{1}{ta} \cdot \frac{1}{Imp_c/Um} \cdot \frac{360}{\alpha_E} \right] \cdot \pm \Delta X_n \text{ in mm/s,}$$

wherein $\frac{1}{ta} \cdot \frac{1}{ImP/Um} \cdot \frac{360}{\alpha_E} = Z9$

*$Imp_c$ signifies the number of pulses produced during the interval between two successive clocking signals ta (see the example on page 47a).

The bracketed expression, denoted Z9, is the same for all the crank webs of one crankshaft; for smaller machines, it can even be that a single fixed value of Z9 can always be used.

Accordingly, from $Z9 \cdot \pm \Delta X_n$, there results, similarly to formula [3.1], the expression $\pm Z\ 10_n$:

Formula [4.1]

$$\pm V_{xn} = Imp_c \cdot \pm Z\ 10_n / \text{mm/s.}$$

On the one hand, $Z\ 10_n$ is updated for $\Delta X_n$ at predetermined incremental angular intervals, and can be calculated and stored; on the other hand, due to the extreme briefness of the intervals between successive clock signals ta for the formula [4.1] for $V_x$, all dynamic rotary-speed variations occurring during rotation of the workpiece spindle are immediately enough taken into account.

Care must be taken that always at least one pulse per clock signal ta enter into formula [4] above, especially when very low rotary speeds of the workpiece spindle are involved. These speed ranges would be as follows for machines designed for the following crank-pin radii greater than 60 mm, 0.01–0.4 rpm
lower than 60 mm, 0.1–3 rpm
For a workpiece-spindle transducer issuing 36,000 pulses per rotation, and with a time interval between successive clock signals ta of 0.01 sec, this latter rotary-speed range of 0.1–3 rpm would correspond to a range of 0.06–18 pulses per clock signal ta. If one assumes that at least one pulse must be furnished per clock signal, then it follows from the foregoing numerical values that, beneath a rotary speed of 0.2 rpm, the digital transducer must be made to produce a greater number of pulses per rotation and/or the interval between successive clock signals ta must be made correspondingly longer.

A commercially available rotary pulse transducer such as presumed above has a rated pulse frequency of 18,000/rotation, which can of course in conventional manner be electronically doubled to 36,000/rotation, and indeed likewise quadrupled to 72,000/rotation. However, transducers of this type are also available which produce, e.g., 90,000 pulses/rotation, which upon electronic quadrupling converts to 360,000 pulses/rotation. These higher-resolution transducers are, however, not only considerably more expensive, but furthermore are very sensitive to vibration, and of course a milling-machine environment includes such vibration; accordingly, in addition, complicated auxiliary electronic circuitry must then be employed to detect and suppress the effect of erroneous pulse indications.

By utilizing the AND-condition (clock signal ta plus one pulse $Imp_c$) for the $V_x$ calculation of formula [4], there is achieved, in accordance with a further feature of the invention, an automatic increase of the clock signal rate at low workpiece rotation speeds for so long as until a pulse $Imp_c$ appears. For example, if the spindle turns at 0.01 rpm, then with a spindle transducer issuing 36,000 $Imp_c$/rotation, a pulse would be transmitted into the computer $RE_1$ only after $18 \times 0.01$ sec=0.18 sec, and only after 0.09 sec. in the case of a transducer which issues 72,000 $Imp_c$/rotation. The multiplier, called multi, for the unit clock signal ta is for example established by means of a counter and serves as the divisor for formula [4]. This lengthened clocking time must be compared with the times of the rotary-speed variations of the workpiece spindle, in order that its effect upon the accuracy of the negative-feedback speed regulation be detected.

The D.C. servomotors of such drives have, for example, a rotary-speed range of 75–3000 rpm. They are energized in accordance with linear current regulation which, at high power and inertia affords a start-up and brake-down time of about 2 sec for a speed range whose lower and upper limits are related as 1:40. Shorter such times would be possible per se, but are of no interest because there is no need for abrupt changes in the rotary speed of the workpiece.

For the foregoing, it will be appreciated that the tolerance of the open- and closed-loop control of the system can be held to values lower than 0.01 mm even with longer clocking times, the latter measured relative to the speed characteristics of the spindle's drive and relative to the small distances X which result at low rotary speeds, when taken in conjunction with the position detection performed at each 0.5° in the speed range 0.01–0.2 rpm.

According to a further feature of the invention, the command voltage derived from the foregoing speed calculation is converted into a variable frequency signal which is compared with the actual-value or feedback signal from the milling carriage and then utilized for negative-feedback speed regulation. This is performed in accordance with the formula $$F_x = V_x \text{ mm/s} \cdot \frac{1}{\Delta X_E} H_z$$

wherein $\Delta X_E$=a distance-unit, e.g., 0.01 mm. The multiplier ($1/X_E$) is the reciprocal of the unit utilized by the actual-value or feedback transducer (DGX 12.3) with which the milling carriage is provided. In this instance, the transducer has a resolution of 0.01 mm. The variable-frequency command signal $f_x$ is, in conventional negative-feedback manner, compared against the variable-frequency feedback signal produced by the transducer (DGX 12.3) provided on the milling carriage. Any detected discrepancies are utilized to correct the commanded value $V_X$. By means of this monitoring action alone, it is already possible to correct for a part of any mechanical error present, such as pitch error and reversal error.

According to a further feature of the invention, the command voltage, converted into the form of a variable-frequency signal, is applied to a commanded-value counter, while simultaneously the pulses from the milling-carriage feedback transducer are applied to an actual-value counter. The counts on the two counters, which are again representative of distances, are applied to a subtractor, and the difference determined by the subtractor, including the sign of the difference is converted into an error-correcting voltage $U_2$ which is mixed with the command voltage $U_1$ in an integrator. The computed feed speed is, considered as a command value, not absolutely accurate, because the magnitude of the frequency value depends upon the number of digits or places in the angular functions.

Also, the conversion of the computed values into command and error-correcting voltages leads to further command-value error which furthermore accumulates over a number of successively performed computations, so that command-value error as low as a mere 0.001 mm per degree can, by the end of one rotation, have built up to several tenths of a millimeter. Accordingly, it is necessary to resort to auxiliary position regulation for the feed distance X.

According to a further feature of the invention, the computer, after receiving the workpiece data, immediately calculates the position $X_n$ which the milling carriage is to have for certain angular sectors $\alpha_E$ (crank pins) and stores these values and then enables the machine for initiation of operation; then during milling, as the angular sectors corresponding to these precalculated required positions $X_n$ are each reached, the respective precalculated required position value $X_n$ is set into the frequency counter Zä3 (commanded value $V_X$), i.e., replacing whatever count is presently in the counter of the negative-feedback speed-regulating circuitry.

In this way, in addition to speed monitoring, there is performed an accurate monitoring of position and, upon the development of discrepancies, a very exact error-correcting voltage is developed. The amount of error attributable to a single position computation, i.e., developed per angular increment $\alpha_E$, performed in accordance with formula [2] need only be within the permissible tolerance range (e.g., 0.01 mm), because continuing accumulation of error is now prevented. The values for $X_n$ can, in accordance with formula [2], be calculated in advance and stored, i.e., after the inputting of workpiece data and before the computer enables the machine for operation, because the rotary speed value $n_c$ does not enter into the position calculation. Accordingly, these $X_n$ values are, during the course of the milling operation, always immediately available for both the $V_x$ speed calculation and the x-position calculation.

A further object of the invention relates to the fact that, during the milling of a crankshaft, due to variations in the material of the workpiece and the wear of the cutting tool employed, there frequently develops a variation in the milling radius and also a marked bowing of the workpiece under load. For this reason, a continual correction of the crank-pin diameter must be performed by adjustment of operation of the machine. Also, it can happen that the first and last crank pins of the crankshaft require diameter corrections differing from those required by a crank pin located near the middle of the crankshaft.

With the present invention, all data needed for the numerical control of the constituent movements and operations to be performed are calculated by the computer itself after it has received the pictorial or construction-point data for the crankshaft design to be implemented. Accordingly, to effect the diameter corrections just mentioned, it is merely necessary to change the settings of the one or more corresponding decade switches, which is of course very simple to do.

For the milling of the crank pins, the following data are needed, the use of these having already been indicated in the formulas presented above:

(a) manually using decade switches, or else using tape, the following workpiece data are input:

$$\left. \begin{array}{l} H = \text{crank-pin throw} \\ R_F = \text{miller radius} \\ R_Z = \text{crank-pin radius} \\ R_{Z1-6} = \text{6-throw crankshaft} \end{array} \right\} \text{ a matter of choice}$$

(b) setting of constant and only occasionally varied data for use in the computations:

Imp/Um = the number of pulses produced by the workpiece-spindle rotary transducer DGC per rotation
$\alpha_E$ = the angular increment for computation updating
ta = time interval between successive determinations of the sum of the pulses produced by the workpiece-spindle transducer DGC (c) constant data needed for the computations (angular functions):
  cos $\alpha$ 0° to 90° storage
  sin$^2$ $\alpha$ 0° to 90° storage Storage of all values assumed by the cos and sin$^2$ functions can reduce the time required for each computation. After input of the data identified at a, b, c above, the major part of the computation data can be immediately computed and stored prior to the start of milling.

(d) data which the machine continually furnishes to the computer:
Imp$_c$ = pulses from the rotary transducer DGC
Imp$_x$ = pulses from the milling-carriage transducer DGX.

In accordance with a further feature of the invention, mechanical indexing of the workpiece for a predetermined angular position of the next crank pin to be machined can be dispensed with. As a substitute for it, the indexing angles, which are measured starting out from a definite position of a pin of a workpiece clamped in the machine, are fed to the computer for the milling carriage, as a result of which, thereafter, the milling carriage during plunge-cutting and lastly in creep operation is brought forward to the pin radius, the rotary speed beginning and ending with the speed preprogrammed for this angular position.

This technique makes it possible to achieve exact indexing with fewer components and, in the case of small workpieces, also yields a time-saving (shorter displacement time compared to the time required for ordinary mechanical indexing), but presupposes that the variations in loading be detected and regulated, e.g., by monitoring of torque or motor current consumption; these variations result, when resort is thusly had to merely computerized indexing without an actual indexing mechanism, from the fact that the distance through which plunge-cutting is performed will be at on point short and at another long.

To mill the profile of oval or rectangular crank webs, essentially the same control methods are applicable as for the crank pins, i.e., an automatic speed adjustment $V_{xw}$ for the milling carriage updated at high frequency and monitoring of position $X_w$ at predetermined angular increments of the workpiece spindle.

For the determination of the values $X_w$, which serve not only for position monitoring and control but also for computation of the speed $V_{xw}$, various computation techniques have been developed, depending upon the configuration (e.g., oval, rectangular) for the crank webs. These make it possible to control the milling-carriage travel $X_w$ with the requisite accuracy, in dependence, on the one hand, upon the rotation of the workpiece spindle and in dependence, on the other hand, upon the profile involved, with only a very small amount of data needing to be fed into the computer for this purpose.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2a depicts the principle underlying the technique utilized, for the case of an external miller;

FIG. 4b depicts the transformation of the radius $R_1$ into the form-radius $R_w$ of a crank web;

FIG. 4b1 depicts the relation between the known angle $\alpha_1$ and the unknown angle $\alpha_2$;

FIG. 4c depicts the transformation of the other radius $R_2$ of the crank web into the form-radius $R_w$;

FIG. 9a depicts the minimum rotary angle (milling angle) $\gamma_F$ corresponding to the edge lines of the rectangular crank web, and the computation of the indexing spacing $\Delta X_{RF}$;

FIG. 10a depicts the computer 5 with manual input and a summarization of computational operations;

FIG. 10b depicts the program storage $Sp_{12}$ and the sequence of operations to be performed for the milling of a rectangular crank web.

DESCRIPTION OF PREFERRED EMBODIMENTS

Figure 1:
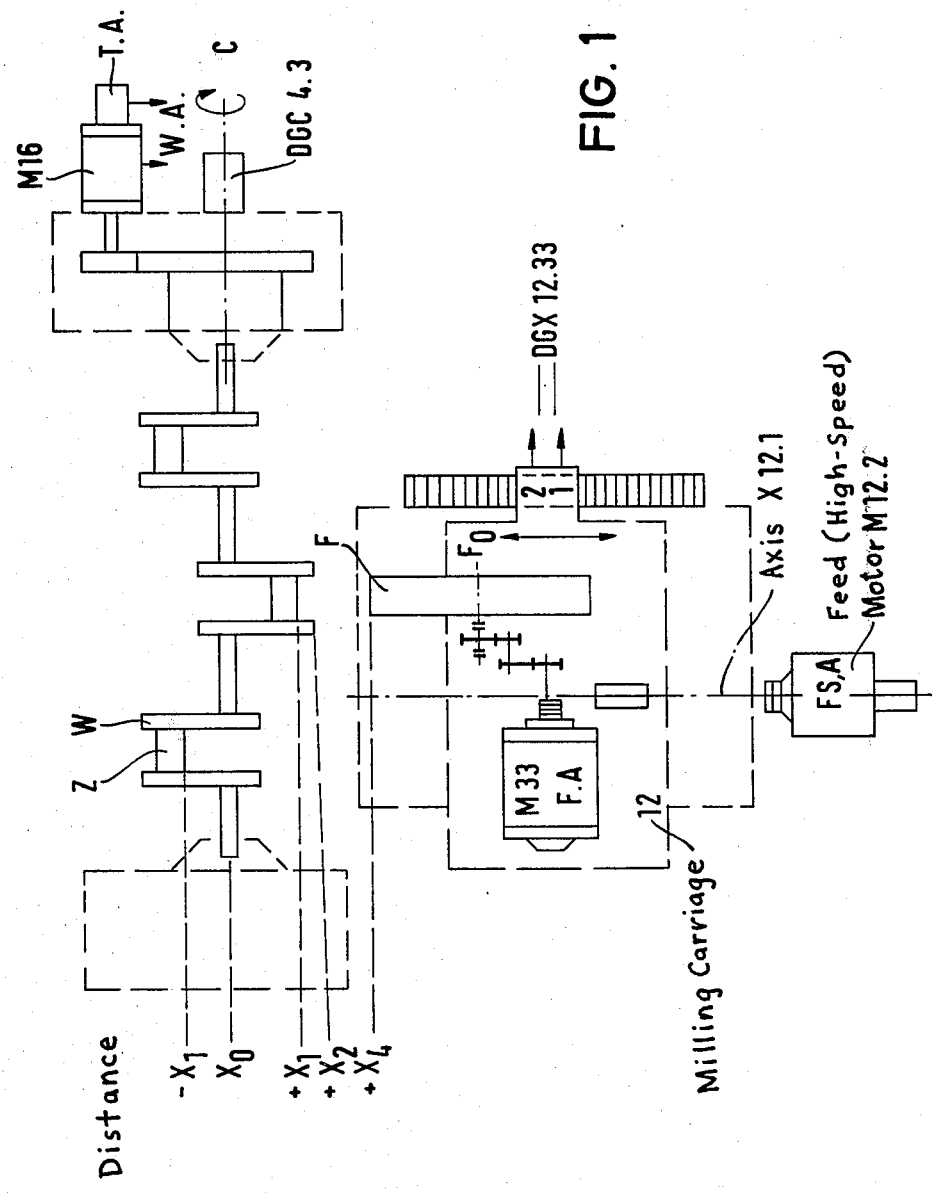
FIG. 1 is a schematic representation of the drives for the workpiece spindle and for the milling carriage.

In FIG. 1, C denotes the workpiece spindle, Z a crank pin and W a crank web. The workpiece spindle C is driven via gears by a drive motor M 16. Associated with spindle C is a rotary transducer DGC 4.3. The miller F, which is driven by the motor M 33, is mounted on the milling carriage 12. The milling carriage 12 is displaced via the spindle 12.1 (axis X) by the feed motor M 12.2. Associated with the milling carriage is a transducer DGX 12.33 with pick-ups 1 and 2.

In FIG. 2a there is illustrated the principle of the milling operation performed. The starting position of the miller's center $F_o$ is located, at the end of the plunge-cutting, across the short distance of the miller periphery at the orbit of the pin Z, in the line $F_o$–$M_o$, $M_o$ being the point of rotation of the workpiece spindle C. In this position the distance L can be had from the formula $(R_F+R_Z)+H$, i.e.,
from the radius of the miller $R_F$
from the radius of the pin $R_Z$
and from the throw of the pin H.

For computation, this distance L divides into
a=H·cos $\alpha$ and
b=$(R_F+R_Z)$·cos $\beta$.
It is to be noted that the value (a) of 0°–90° or 271°–360° is added to (b), and that from 91°–180°–270° is subtracted from (b). In the case of plunge-cutting via the "long way" through the webs, the computer would begin at 180°.

Figure 2B:
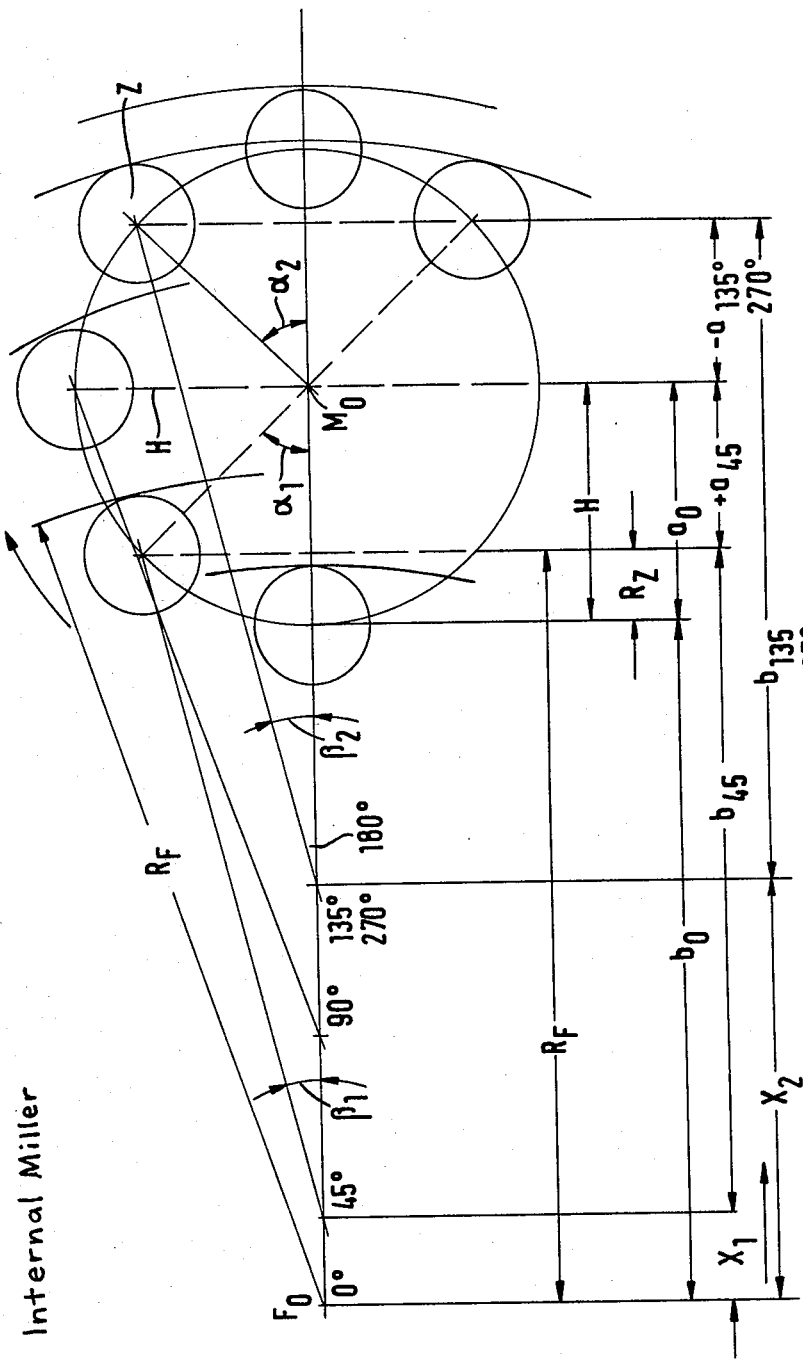
FIG. 2b depicts the same principle, for the case of an internal miller.

In FIG. 2b an internal miller is provided. As a result the value of L is $(R_F-R_Z)+H$. In formula [2] $(R_F-R_Z)$ must then be inserted into the root for $R_F+R_Z$.

Figure 3A:
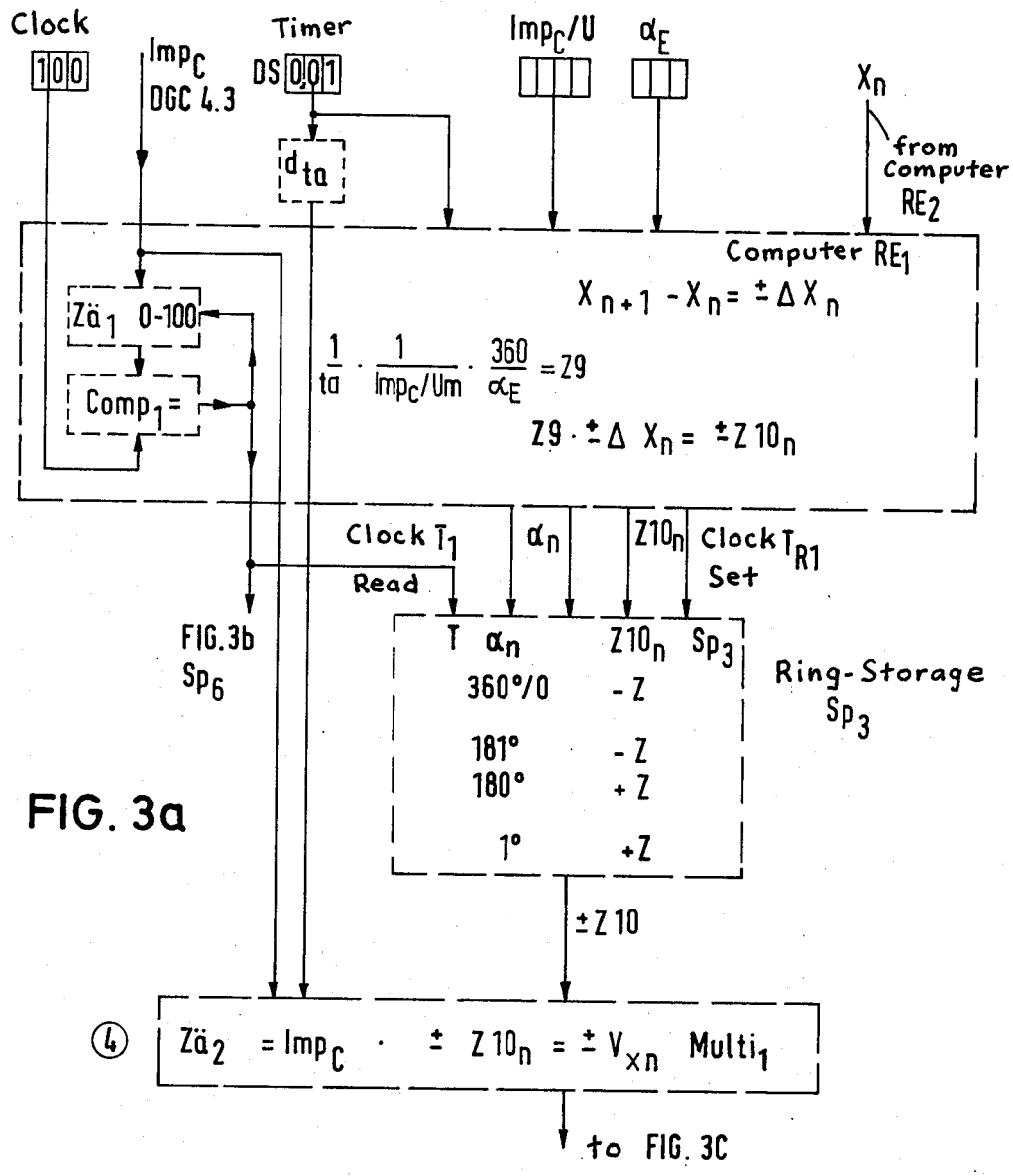
FIG. 3a depicts the manner in which the speed $V_x$ is computed.

In FIG. 3a, depicts the computation for the speed $V_x$ for the milling of a pin. In addition to the explanations already made, it should be mentioned that the pulses $Imp_c$ from the transducer DGC 4.3 form the clock signal $T_1$ via the counter $Zä_1$ and the adjustable comparator $Comp_1$, in dependence upon the unit-angle $\alpha_E$; e.g., 1°=100 pulses.

With a clocking $T_{R1}$, the computer $RE_1$ retrieves from computer $RE_2$ the $X_n$ values stored in the storage $Sp_6$ (FIG. 3b), to form the increments $\Delta X_n$.

The presetting DS of a timer ta (clock) is transmitted into the computer $RE_1$. The latter forms therefrom the reciprocal value 1/ta which, with the values 360° $Imp_c$-

/rotation and $\alpha_E$, yields the expression Z9. After the multiplication with $\pm\Delta X_n$ in accordance with formula [4.1] there results the Z $10_n$ value, which is stored in the storage Sp$_3$ in accordance with address and sign.

With the pulses Imp$_c$ and the timer ta the counter Zä$_2$ is driven in such a manner that during the interval from one clock signal ta$_n$ to the next ta$_{n+1}$, i.e., for example during 0.01 sec, the incoming pulses are counted. When the clock signal ta$_{n+1}$ is produced, the result is transferred to the multiplier Multi$_1$ via an AND-gate upon the arrival of the next pulse and the counter Zä$_2$ is set to zero, etc. Sum Zä$_2 \cdot \pm$Z $10_n$ yields $\pm V_{xn}$ in accordance with formula [4.1]. This value is produced in synchronism with the clock ta and transmitted to FIG. 3c.

Figure 3B:
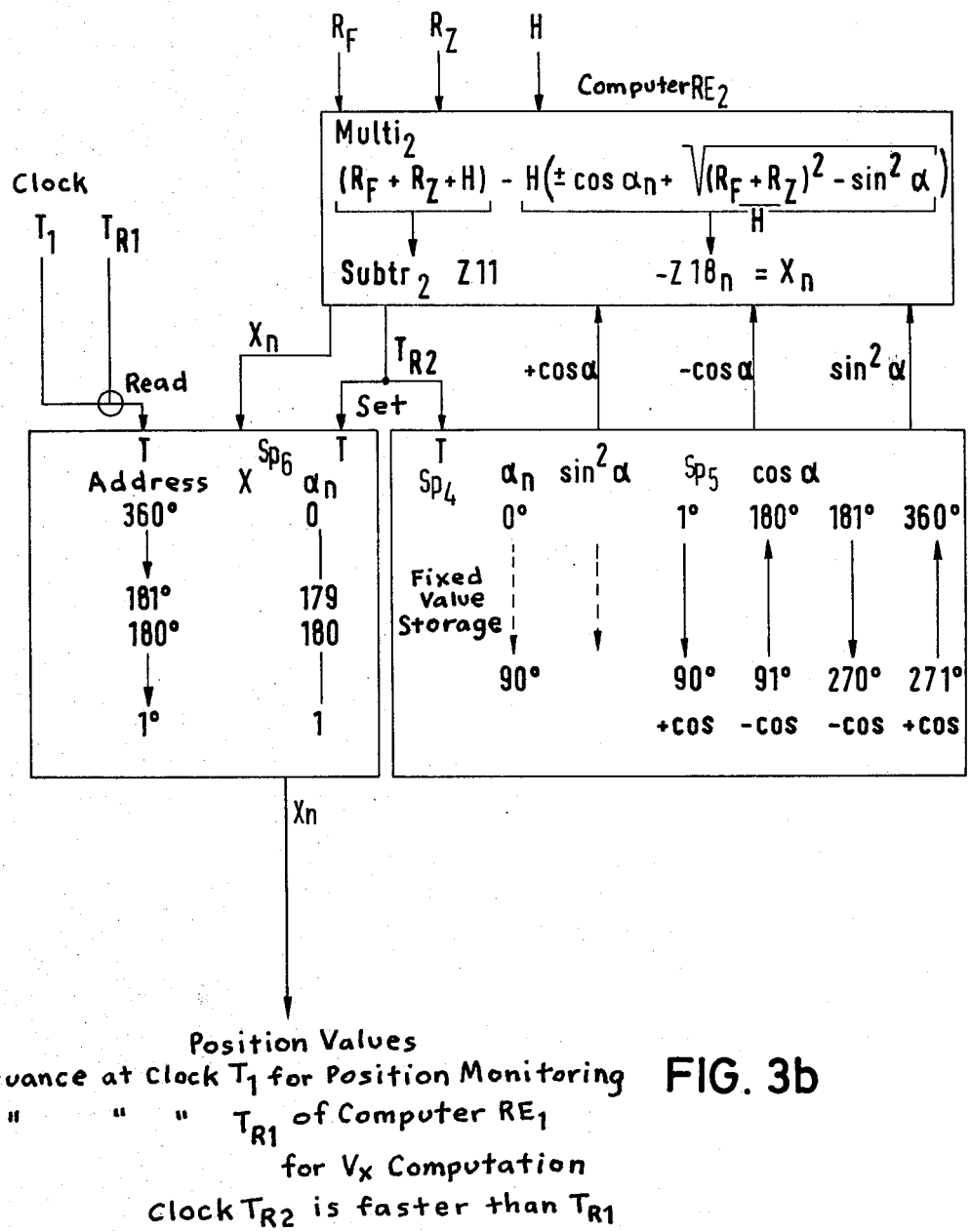
FIG. 3b depicts the computational operations performed in the computer for computation of speed $V_x$.

FIG. 3b shows the method of computation for the position values. The computer RE$_2$ receives for the distances x the workpiece input data H, R$_F$ and R$_Z$. It reads out from the fixed-value storages Sp$_4$ and Sp$_5$ the requisite angle-function values and computes the Z-values with its own clocking rate R$_{R2}$, the computer RE$_1$ needing to be somewhat slower (T$_{R1}$) than the computer RE$_2$, and then transmits the distance Z 11 as a fixed workpiece value, as well as the result Z 18 (0°–180°), to the subtractor Subtr.$_2$. The position values X$_n$ computed therefrom are then stored in storage Sp$_6$ in accordance with address and angular degrees.

Figure 3C:
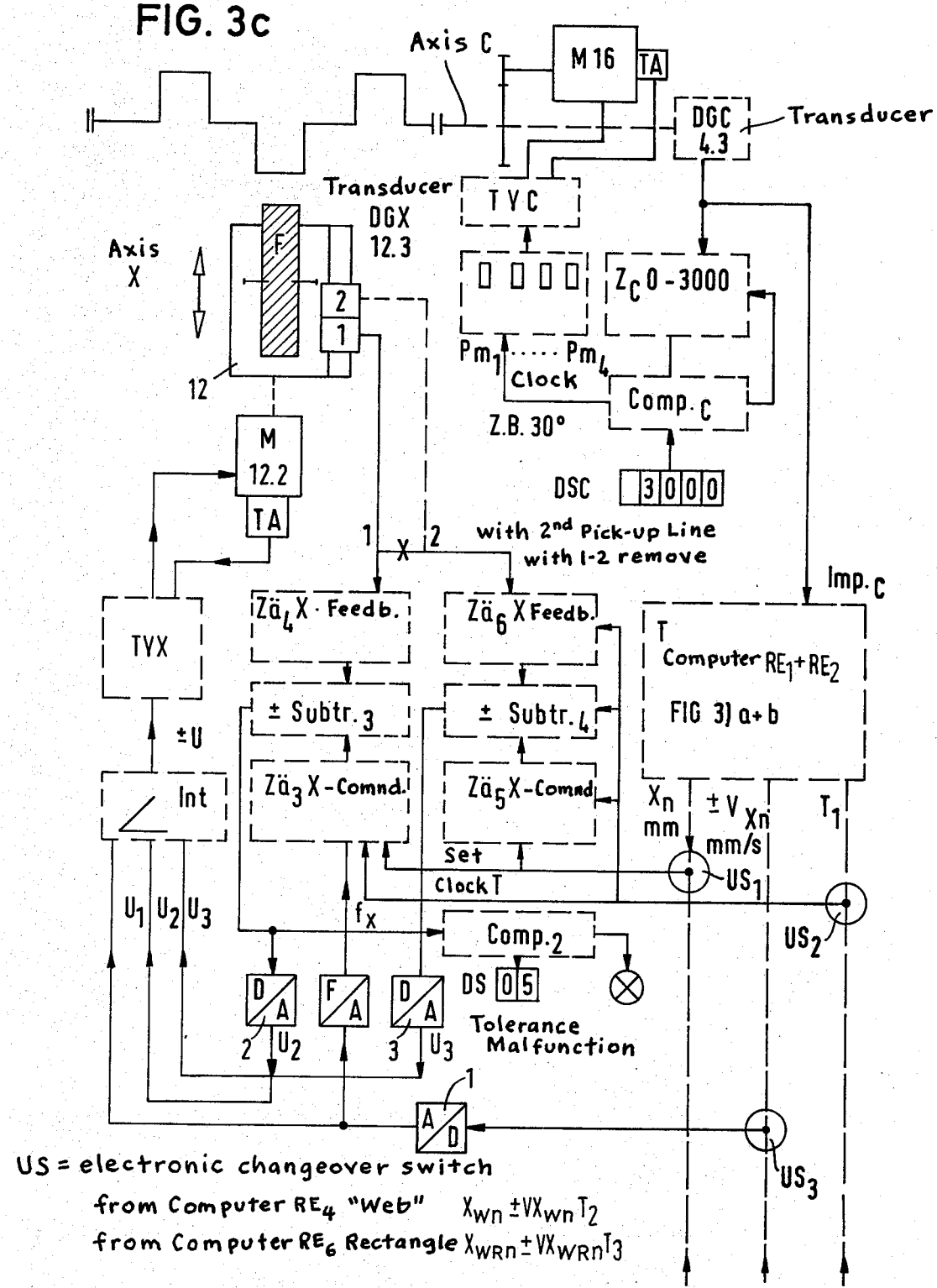
FIG. 3c is an overview depiction of the machine's functional groups C+X and their drives, control and regulating arrangements.

During operation of the machine, the clock for storage Sp$_6$ changes from T$_{R2}$ to T$_1$, and in correspondence thereto the X$_n$ values are transmitted in accordance with the new clocking rate to the position-monitoring and position-regulating system of FIG. 3c.

The reliability of the correct sequence of the read out of the data from the storages Sp$_3$ and Sp$_6$ is especially important.

According to a particular concept of the invention, the storages Sp$_3$ and Sp$_6$ issue, along with the issuance of the Z $10_n$ or X$_n$ values, their addresses in terms of angle number, e.g., for each 30°. These angular degrees must be the same for both storages. They are transmitted to a comparator and, in the event of inequality, a malfunction is indicated, by non-illustrated means.

FIG. 3c provides an overview of the involved functional groups of the machine and of the control and regulating systems.

The workpiece, the crankshaft, is driven by motor M 16 about rotation point C. Its rotary speed is determined by a number of potentiometers, e.g., Pm$_1$ . . . Pm$_4$ and the thyristor TYC. The digital transducer DGC 4.3 which likewise rotates about rotation axis C and issues e.g., 36,000 pulses per rotation, feeds pulses to a counter Z$_c$ which, via a respective comparator Comp$_c$, at a certain presettable number of pulses, e.g., 3000=30°, issues a signal (clock) which activates the next potentiometer Pm$_{n+1}$.

By means of this arrangement, the rotary speed can be continually matched to the operating conditions during one rotation of the workpiece.

The transducer DGC 4.3 also clocks (clock T$_1$) the storage Sp$_3$ (FIG. 3a) and the storage Sp$_6$ (FIG. 3b).

The speed value V$_x$ (FIG. 3a) is fed via a D/A converter 1 as a command voltage U$_1$ or U to the thyristor Tyx for a D.C. driver motor M 12.2 or to a corresponding energization-control stage for a stepper motor.

As already indicated, the automatic speed adjustment is not accurate enough, and furthermore there can develop errors resulting from mechanical causes, such as for example reversal error or pitch error of the drive spindle of the milling carriage 12.

Therefore, according to a particular feature of the present invention, the command voltage U$_1$ is converted by means of an auxiliary analog frequency converter A/F into a variable-frequency command signal and transmitted to a counter Zä$_3$ (commanded value). From the machine carriage 12, a digital transducer simultaneously transmits its pulses to the counter Zä$_4$ (feedback value). The two counts once more are representative of distances x, and are transmitted to a subtractor and the difference, with corresponding sign, is, via a further D/A converter D/A$_2$, mixed as an error-correcting voltage U$_2$ via an integrator with the command voltage U$_1$.

The most important thing for this correction is that, by means of the short time interval of ta, in which the pulses from transducer 4.3 are received and processed in multiplier Multi$_1$, a continuous monitoring action is guaranteed.

The distance X$_n$ (FIG. 3b), which is accurately computed, is in FIG. 3c directly fed to the counter Zä$_5$ as a command value. For safety reasons (redundancy), the feedback value from the milling-carriage transducer is fed to a second counter Zä$_6$. The counts on the two counters are in conventional manner fed to a subtractor subtr.$_4$. The difference, after transmission through a D/A converter D/A$_3$, is furnished as an error-correcting voltage U$_3$ which is likewised mixed in the integrator with U$_1$ and U$_2$. By means of a preselected tolerance value, it is possible in conventional manner to detect whether any error developing has become too great, so that the machine can be brought to a standstill or the milling carriage caused to return to starting position.

Because now two command values are furnished (namely: first, the constant one via frequency which, however, as a sum of time plus frequency is not exact enough; and second, the X$_n$ position which is exact in certain angular sections), it is necessary that, in the moment in which by means of the clock T$_1$ the monitoring of position is performed, the commanded-value counter Zä$_3$ be with the same clock set to the same X$_n$ value as the commanded value on the counter Zä$_4$.

Furthermore, to increase the reliability of the actual-value detection, a second pick-up is provided in the command-value measuring system (e.g., a second head on the scale 12.3 in FIG. 3c). The comparison of the two actual-value counters Zä$_4$ and Zä$_6$ provides for a continuous monitoring of the actual-value circuits, and possibly also an indication of malfunction when malfunction arises.

With large workpieces, the doubled number of devices for the commanded versus actual value monitoring action is to be used for reasons of safety. With smaller crankshafts, the X$_n$ position monitoring action could be, as already described, accomplished by merely inserting the X$_n$ values into the counter Zä$_3$.

The larger number of devices, on the other hand, does additionally facilitate trouble shooting.

Figure 4A:
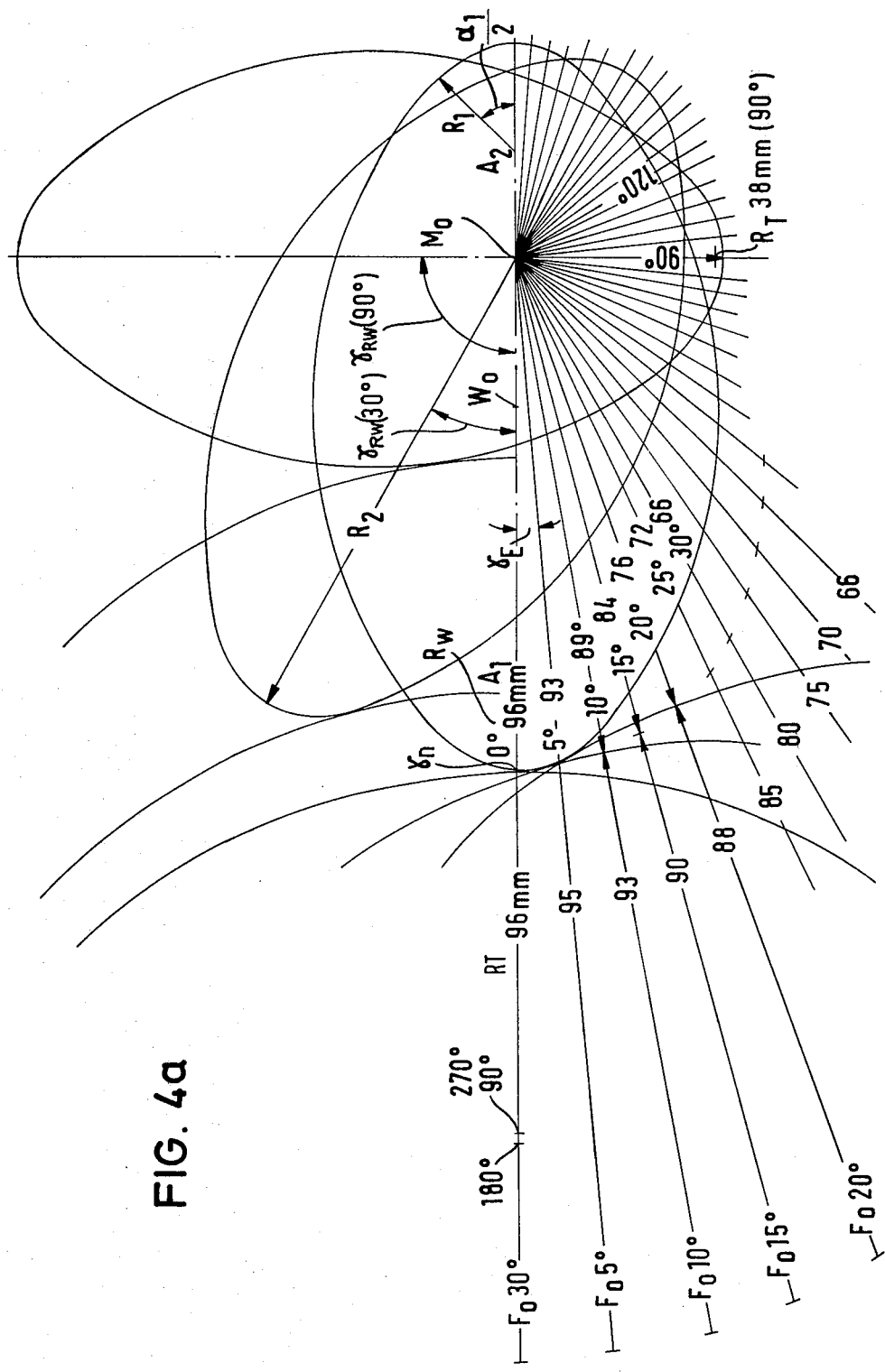
FIG. 4a illustrates the position from the middle of the miller to the rotation point of the crank web.

FIGS. 4a, 4b and 4c depict the principle whereby the crank webs are milled. The milling of crank webs in dependence upon rotation of the workpiece requires, in comparison to the production of the crank pins, a greater number of workpiece data for the computation of the milling-carriage feed distance.

For the construction of the web, the radii R$_w$ which determine the shape of the web can be marked off and measured (FIG. 4a) starting from the middle point of rotation M$_o$ in predetermined unit-angle increments $\alpha_E$.

For oval- and pear-shaped crank webs, which consist of arcs of circles of differing radii $R_1$, $R_2$, ($R_3$) and component angles $\alpha_1$, $\alpha_2$, ($\alpha_3$), the requisite radii $R_w$ can be computed in known manner by transformation of the radii with reference to the middle point of rotation $M_o$ (FIGS. 4b and 4c).

Now, the object of the invention is to derive from the form radii $R_w$, which are determined by resort to construction or in the computer, the associated control data for the feed X of the milling carriage in conjunction with the rotation of the workpiece.

The constructively produced form radii $R_w$ (FIG. 4a) in the orbit of the middle point of rotation $M_o$, with an assumed unit-angle spacing of $\alpha_E$ 5°, serve as the basis for finding the radii $R_T$ which result from the tangential contact of the miller's profile at the web profile and from the point of intersection of the miller's profile with the extended radius $R_{Tn}$ (in the direction of the middle point $F_o$ of the miller), i.e.,:

$$F_oM_o - R_F = R_{Tn}, \text{ e.g., } \begin{array}{l} R_T 10 = 93 \text{ mm } (R_w = 89) \\ R_T 15 = 90 \text{ mm } (R_w = 84) \\ R_T 20 = 88 \text{ mm } (R_w = 76) \end{array}$$

The values $R_{Tn}$ are measured off a pictorial representation and fed into a storage $Sp_8$ (FIG. 6b) of the machine's computer with the associated rotation angle, e.g., $\gamma R_w$ 15°, as the first step in determining the feed distance X. The contact points of the miller itself at the profile of the crank web have unknown angles.

If, as a starting position, the long axis of the crank web extends horizontally to the middle of the miller (FIG. 4a), then $R_w$ 0°=$R_T$ 0°, and then $R_T$ becomes larger than $R_w$ until at, for example, 120° the form of the web converts to circular form, at which point then $R_w=R_T$.

The size of the unit angle $\gamma_E$ should depend upon the permissible tolerance with respect to accuracy of shape. With a radius $R_w$ of 100 mm, if $\gamma=5°$ (for circular shape), this would result in an arc height of about 0.01 mm.

The computer-performed determination of the $R_{Tn}$ values presupposes, in contrast to the constructive solution, that each of the web's form radii $R_w$ at the location of intersection with the profile of the web additionally constitutes the contact point of the miller. The length $R_w$ and the associated angle n. $\gamma_E$ are thus known for this contact point of the miller from a drawing or by calculation in accordance with FIGS. 4b and 4c.

Figure 6A:
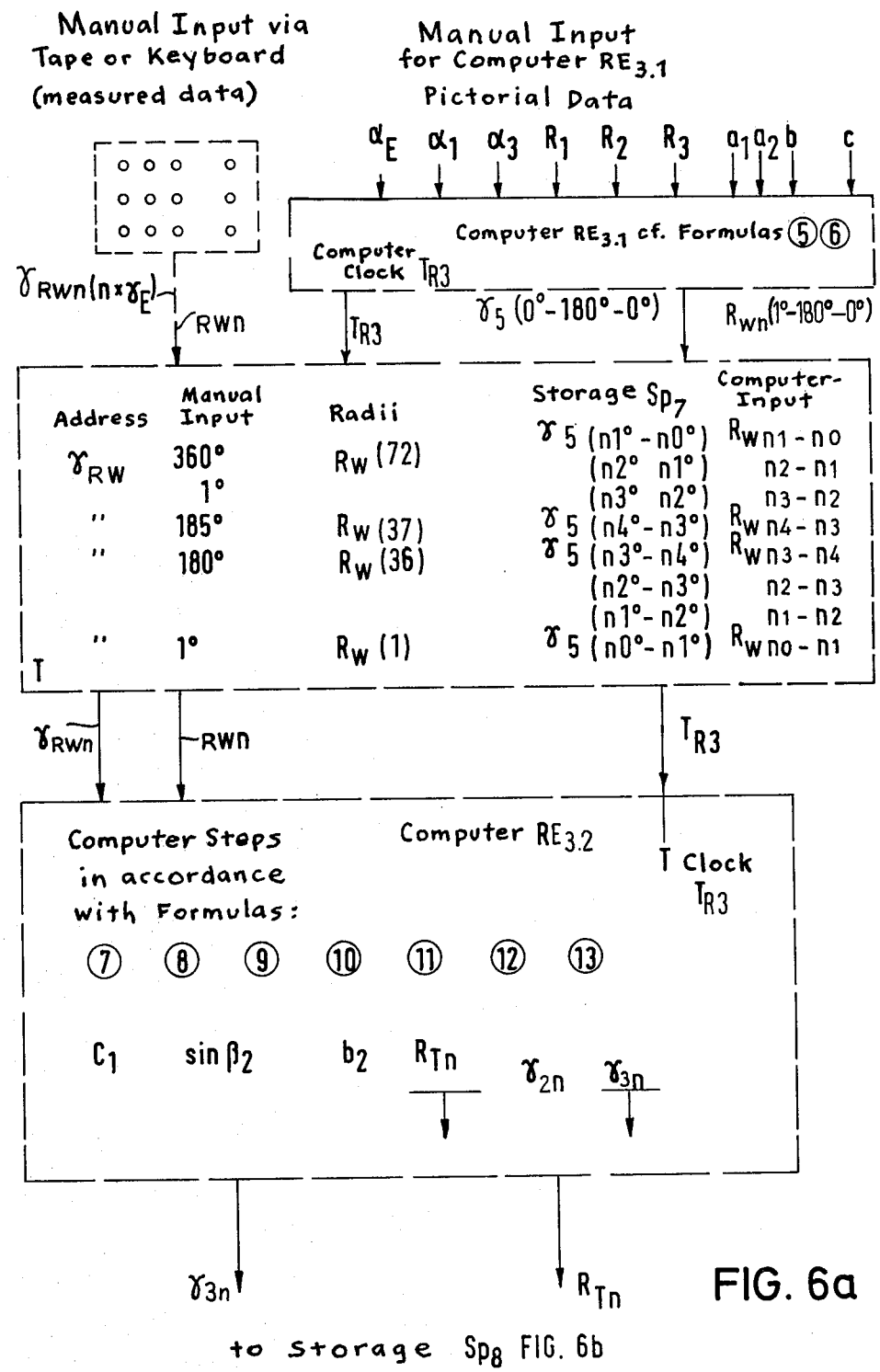
FIG. 6a depicts the set-up of the computer of these auxiliary triangles and the associated angle for the milling of a crank web.

For the computation of the radii $R_w$, the following pictorial data are needed for an oval crank web, and must be fed to the computer $RE_{3.1}$ (FIG. 6a), in correspondence to FIGS. 4b and 4c.

Data for rectangular crank webs are not discussed here, for the sake of brevity.

radii $R_1R_2$ ($R_3$ pear-shaped crank web)
angle $\alpha_1$ ($\alpha_2 = 180° = \alpha_1$)
($\alpha_3$ pear-shaped crank web)

$$\left(\alpha_2 = 180° - \left(\frac{\alpha_1 + \alpha_3}{2}\right)\right)$$

$\alpha_E$ unit-angle for the computation to be performed. Starting position, long axis horizontal, 1st radius=$R_w$ 0°

As can be seen from FIGS. 4b and 4c several illustrations are necessary for the conversion of the radii $R_1$ and $R_2$ into form radii $R_w$ with middle point $M_o$:

FIG. 4b $$R_w 0° \to n_1 = \sqrt{\left[\left(R_1 \cdot \cos 0° \to \frac{a1°}{2}\right) + (a_1 + c)\right]^2 + \left(R_1 \cdot \sin 0° \to \frac{a1°}{2}\right)} \quad [5.1]$$

FIG. 4bI + 4c $$R_w\, n1 \to n2 = \sqrt{\left[\left(R_2 \cdot \cos \frac{\alpha 2°}{2} \to 0°\right) - b\right]^2 + \left[\left(R_2 \cdot \sin \frac{\alpha 2°}{2} \to 0°\right) + C\right]^2} \quad [5.2]$$

FIG. 4bI + 4c $$R_w\, n2 \to n3 = \sqrt{\left[\left(R_2 \cdot \cos 0° \to \frac{\alpha 2°}{2}\right) - b\right]^2 + \left[\left(R_2 \cdot \sin 0° \to \frac{\alpha 2°}{2}\right) - C\right]^2} \quad [5.3]$$

FIG. 4b $$R_w\, n3 \to n4 = \sqrt{\left[\left(R_1 \cdot \cos \frac{\alpha 1°}{2} \to 0°\right) + (a_2 - c)\right]^2 + \left(R_1 \cdot \sin \frac{\alpha 1°}{2} \to 0°\right)^2} \quad [5.4]$$

The computations in accordance with formula [5] are performed at the selected computation step, e.g., for $\alpha_E=5°$. The associated radii-angle $\gamma_5$ result from the following computations, which are performed for the same computational step at $\alpha_E$; the last computational step can contain a smaller angle than $\alpha_E$.

These values are computed in accordance with the following formulas:

FIG. 4b to 5.1

$$\sin \gamma_{5(n0°-n1°)} = \frac{R_1 \cdot \sin 0° - \frac{\alpha 1}{2}}{R_w (n_0 - N_1)} \quad [6.1]$$

FIG. 4c to 5.2

-continued $$\sin \gamma_{5(n1°-n2°)} = \frac{R \cdot \sin \frac{\alpha 2}{2} - 0° + C}{R_w (n_1 - n_2)} \quad [6.2]$$

6.1 + 6.2 = 90° (I. Quadrant)

FIG. 4c to 5.3

$$\sin \gamma_{5(n2°-n3°)} = \frac{R_2 \cdot \sin 0° - \frac{\alpha 2°}{2} - C}{R_w (n_2 - n_3)} \quad [6.3]$$

FIG. 4b to 5.4

$$\sin \gamma_{5(n3-n4)} = \frac{R_1 \cdot \sin \frac{\alpha 1°}{2} - 0°}{R_w (n_3 - n_4)} \quad [6.4]$$

6.3 + 6.4 = 180° (90° II. Quadrant)

These radii rotation angles $\gamma_{5n}$ in accordance with formula [6], expressed in angular degrees and taking into account the quadrant in which located, are thus no longer the sum of the unit-angles as with the constructed radii $R_w$. The difference-angle $\gamma_6$ therefore is to be had from the difference of the two associated radii-angles $(\gamma_{R5n+1} - \gamma_{R5n}) = \gamma_{6n}$.

For the following computations, there are accordingly to be inserted:

| for constructive $R_{wn}$ | for calculated $R_{wn}$ |
|---|---|
| $R_w$ 0°, $R_w$ 5°, $R_w$ 10°, etc. | $R_{wn0}$, $R_{wn1}$, $R_{wn2}$, etc. |
| $\gamma_E$ e.g., 5° | $\gamma_{6n0}$, $\gamma_{6n1}$, $\gamma_{6n2}$, etc. |

Figure 5:
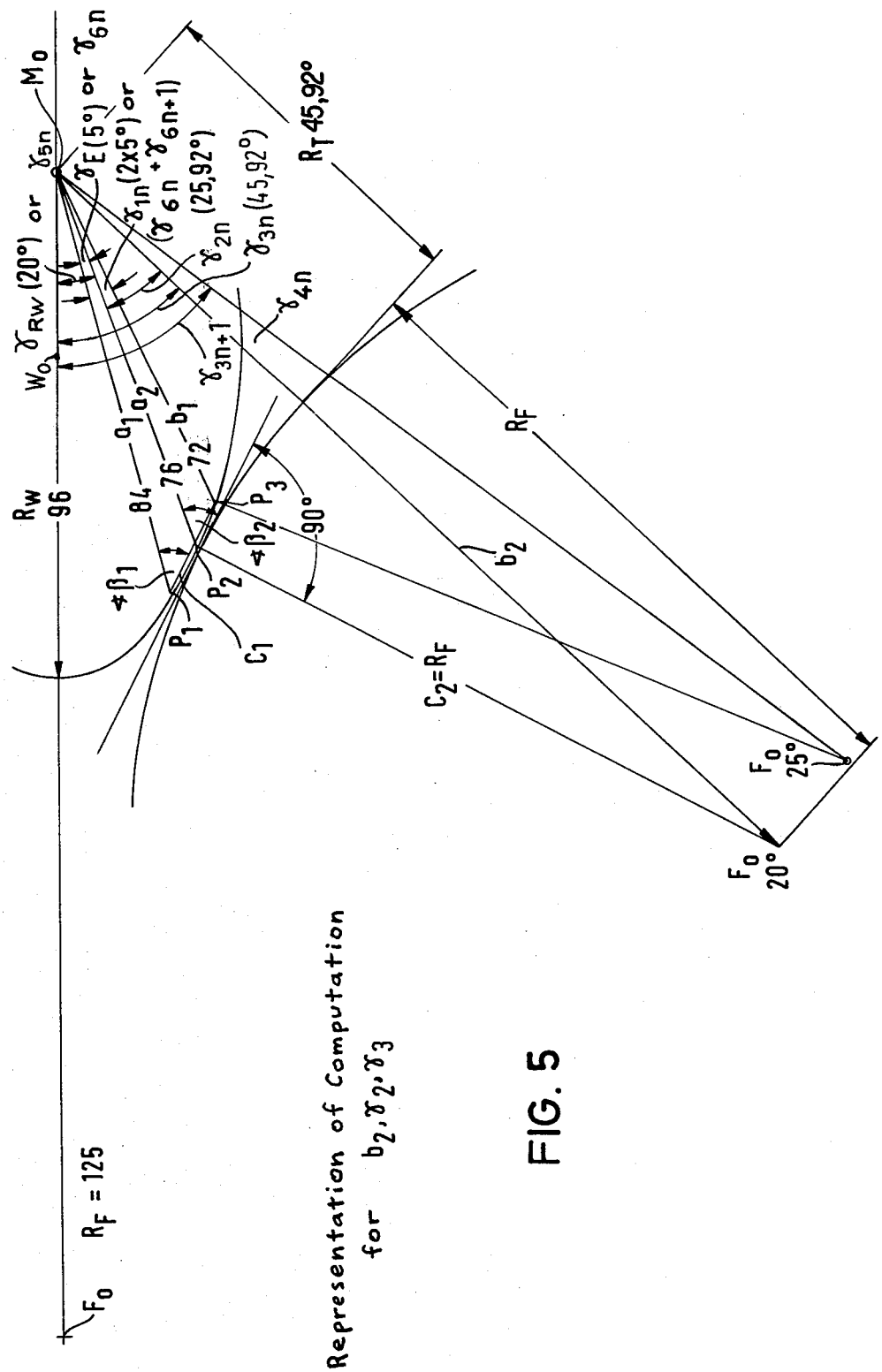
FIG. 5 represents the construction of two triangles as an aid to determining the position of the middle of the miller at a crank web.

For the computation of the actual distance radii $R_T$ for the distance $F_o-M_o$, the following relationships are to be introduced in correspondence to FIG. 5:

| | | |
|---|---|---|
| $R_w 15$ | $= a_1 =$ | 84 mm according to FIG. 4a |
| $R_w 20$ | $= a_2 =$ | 76 mm according to FIG. 4a |
| $R_w 25$ | $= b_1 =$ | 70 mm according to FIG. 4a |
| $R_F$ | $= c_2 -$ | 125 mm according to FIG. 4a |
| $P_{1-3}$ | = intersection point of the radii $R_{wn}$ | |
| with the profile of the crank web, also being the contact point of the miller. | | |

FIG. 5

The miller is to be permitted to contact the contact point, e.g., $P_2$, only tangentially; its profile is thus not to be permitted to contact the two neighboring contact points $P_1$ and $P_3$ simultaneously, nor undercut them.

Therefore in accordance with a particular feature of the invention, a connecting line $c_1$ for the two points $P_1$ and $P_3$ is drawn (FIG. 5) which accordingly lies parallel to the tangent at contact point $P_2$.

If it is assumed that the contact point $P_2$ is known and has a distance of 76 mm from $M_o$ and a sum-angle $\gamma_{Rwn}$ or $\gamma_{5n}$, e.g., 20°, then in addition thereto one must ascertain the radius $R_T$ with its angle $\gamma_{3n}$, which lies on the line $F_o-M_o$, and accordingly determines the distance of the miller's middle $F_o$, as a result of which the miller's profile contacts the web's profile at the point $P_2$.

To this end, in accordance with a further feature of the invention, there is formed as an aid in this respect an auxiliary triangle, with the two known radii $a_1$ and $b_1$ and the angle $2\cdot\gamma_E$ or $(\gamma_{6n}+\gamma_{6n+1}) = \gamma_1$.

From this the third side $c_1$ can be computed in accordance with the following formulas:

$$c_1 = \sqrt{a_1^2 + b_1^2 - 2a_1 \cdot b_1 \cdot \cos \gamma_1} = 18.104 \text{ mm} \quad [7]$$

from which follows for angle $\beta_1$ $$\cos \beta_1 = \frac{c_1^2 + a_1^2 - b_1^2}{2 \cdot c_1 \cdot a_1} = 0.723256 \quad [8]$$

$$\beta_1 = 43.67°$$

$$\beta_2 = \beta_1 + \alpha_E \text{ or } \beta_1 + \gamma_{6n} \quad [9]$$
for computed $R_w$
$= 43.67 + 5° = 48.67°$
$\sin \beta_2 = 0.750918$ When these values are ascertained, the line $F_o-M_o$ can now be looked for, and when from that the value $R_F$ has been ascertained, the value $R_T$ can be had.

The angle $\beta_2$ is the tangent angle to the radius $a_2$, for which the associated radius $R_T$ and its angle $\gamma_{3n}$ are then looked for. The angle $\beta_2$ is increased by 90° and accordingly forms the second side $c_2$ of the second triangle. The latter has the magnitude $R_F$. From the two sides $a_2$ and $c_2$ and the angle $\beta_2$ it is then possible to ascertain the third side $b_2$, as follows:

$$b_2 = \sqrt{a_2^2 + c_2^2 + 2a_2 \cdot c_2 \cdot \sin \beta_2} = 188.860 \text{ mm} \quad [10]$$

(when the angle $\beta$ is greater than 90°, then in formula [7], instead of a subtraction, an addition is performed, with $\sin \beta_2$ instead of $\cos \beta_2$)

$$b_2 - R_F = R_T - 188.86 - 125 = 63.86 \text{ mm} \quad [11]$$
with $b_2$ now determined and the angle $\gamma_2$ of triangle $a_2 - c_2 - b_2$ already known, $$\cos \gamma_2 = \frac{a_2^2 + b_2^2 - c_2^2}{2 \cdot a_2 \cdot b_2} = 0.899409 \quad [12]$$

$\gamma_2 = 25.92°$
With the angle $\gamma_2$ and the angle $\gamma_{Rwn}$ or $\gamma_{5n}$, [13]
e.g., = 20°, for the radius $R_w$ 20 ($a_2$) from which in this equation one starts, there results the rotation angle
$\gamma_3$ with 20° + 25.92° to 45.92°.

Figure 6B:
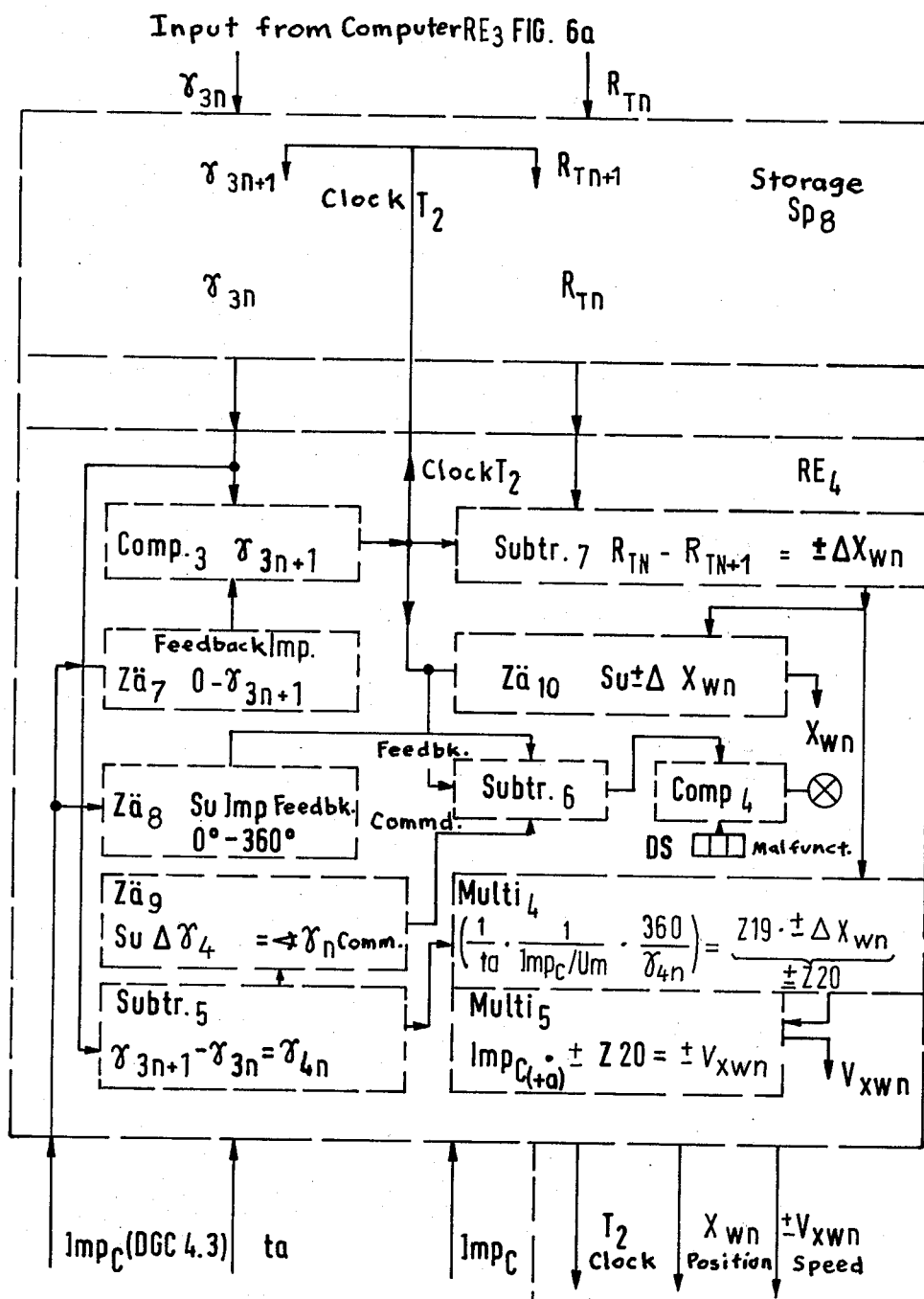
FIG. 6b depicts the set-up or the actual configuration of the computer for the computation of speed, distance and the clocking for a crank web.

In this way, all the $R_T$ values and their $\gamma_3$ values can be computed from the radii $R_w$, which are then fed to the machine's computer and in particular to storage $Sp_8$ and used for the computation of the feed motion X (FIG. 6b).

Because even with a unit-angle $\gamma_E$ of 5° a high accuracy of profile configuration of the crank web is achieved, what is then involved is the computation of the values $R_T$ and angle $\gamma_3$ for 36 (180°/5°) positions.

To this end, it is necessary to perform computational steps in the sequence going from formula [7] through formula [13], in order. The computations are repeated for each constructed or computed radius $R_w$.

FIG. 6a

If the values of the form radii $R_w$ are available by reason of construction, then these can be manually input, by means of a keyboard, into the storage $Sp_7$ with the associated radius-angles $\gamma_{Rwn}$ as addresses. With a unit-angle $\gamma_E$ of e.g., 5°, this would be 36 values for 180°.

These values are read out from computer $RE_{3.2}$ in a fixed angular sequence and then subjected to computational processing in accordance with formulas [7] through [13], in order, and the desired results

| distance-radii | $R_{Tn_0} = n_1$ mm |
|---|---|
| rotation angle | $\gamma_{3n_0}° = n_1°$ |

If the radii $R_w$ and their angles $\gamma_{5n}$ are computed in accordance with equations [5.1] through [5.4] (using computer $RE_{3.1}$), then these results are likewise fed into the storage $Sp_7$ in the requisite sequence using the angles $\gamma_{5n}$ as addresses, and subjected in the computer $RE_{3.2}$ to the requisite computational operations.

The computations are immediately performed by the computer after the input of the starting data, in accordance with the selection of operating mode, i.e., pin milling or web milling.

For the machining of the webs with an external or internal miller, the feed speed of the milling carriage is pregiven as $V_x$ as in the case of maching the crank pins. This is computed with the present invention in accordance with the constructed or computed radii $R_T$, which latter do not establish the form of the web but instead the position of the middle point of the miller. The difference of the radii $R_T$ accordingly always give also the relevant value of distance. For establishing the feed speed, therefore, the difference of two neighboring radii $R_T$ is measured and brought into combination with the spacing of the two radii (angle $\gamma_4$) and with the rotary speed of the workpiece spindle.

$$V_{xw} = n_c \cdot (R_{Tn+1} - R_{Tn}) \cdot \frac{360°}{\gamma_{4n}} \text{ mm/min.} \quad [16]$$

wherein $\gamma_{4n}$ consists of the difference $(\gamma_{3n+1} - \gamma_{3n})$.

With the use of the rotary pulse-generating transducer on the workpiece spindle C, the formula assumes the following form:

$$\pm V_{xw} = Imp_c \cdot \left[ \frac{1}{ta} \cdot \frac{1}{Imp_c/Um} \cdot \frac{360}{\gamma_{4n}} \right] \cdot \pm \Delta X_{wn} \quad [17]$$

From the difference $R_T$ there is also obtained the sign ($\pm$) for the direction of motion of the milling carriage: The plus-sign (+) indicates the direction of the miller towards the workpiece.

Example: The difference between $R_T 15 = 95$ mm and $R_T 20 = 93$ mm amounts to $+2$ mm. If the rotary speed of the workpiece spindle amounts to 2 rpm=72,000 Imp/min=12 pulses/clocking signal ta, with the interlocking interval of ta being 0.01 sec, i.e., 1/ta=100, then $$+V_{xw} = 12 \frac{1}{0.01} \cdot \frac{1}{36000} \cdot \frac{360}{5} \cdot 2 = 4.8 \text{ mm/sec}$$

FIG. 6b:

During the course of milling, the counters $Zä_7$ and $Zä_8$ in the computer $RE_4$ are fed pulses from the digital transducer DGC 4.3. Counter $Zä_8$ continually indicates the actual or feedback angular position 0°-360°, whereas by means of the counter $Zä_7$ and comparator $Comp_3$ the computer clock $T_2$ is generated by read-out of the angular values $\gamma_{3n+1}$.

With the clock $T_2$, also the value $R_{Tn+1}$ is read out and, via the subtractor $Subtr._7$ and with $R_{Tn}$, the difference $\pm \Delta X_{wn}$ is formed. The sum $\pm \Delta X_{wn}$ (counter $zä_{10}$) indicates the momentary value of the position X of the milling carriage, and is, at clock $T_2$, transmitted to the position-regulating system of FIG. 3c (drive motor control system) so that the latter monitor the position of the milling carriage.

With the $\Delta X_{wn}$ values, and with the spacing angle $\gamma_{4n}$ formed in the subtractor $Subtr._5$ in accordance with FIG. 5, as well as with the already available values: $Imp_c$/rotation; $Imp_c$·ta; 360°, there is now computed the speed in accordance with formula [17], with the expression Z 19 having been beforehand determined from $$\frac{1}{ta} \cdot \frac{1}{Imp_c/rot} \cdot \frac{360}{\gamma_{4n+1}}$$

and multiplied with the value $\pm \Delta X_{wn}$ at clock $T_2$ and then stored as expression Z 20n. During operation, in accordance with the invention, and at the clocking intervals ta of e.g. 0.01 sec. there is only still to be performed the simple multiplication $$\pm V_{xwn} = Imp_c \cdot \pm Z\, 20\, n. \quad [18]$$

This value is matched to or updated for the dynamic motion of the workpiece spindle and is transmitted, at the clocking rate, to the control and regulating system of the drive of FIG. 3c.

The computer $RE_4$ (FIG. 6) also performs, in accordance with the invention, a monitoring of the angle computations $\gamma_1 - \gamma_4$, which are interdependent, by adding the angle values $\gamma_4$ in the counter $zä_9$, and by feeding the latter as a command value to the subtractor $Subtr._6$ for comparison with the pulse-sum of counter $Zä_8$ which latter serves as an actual or feedback value.

This must occur with the clocking $T_2$, the values $\alpha_0°-360°$ which have just been run through needing to coincide with the value of the angle $\gamma_{3n}$ (not $\gamma_{3n+1}$). This same remark applies also for the position-monitoring sum $\Delta X_{wn}$; the value $X_{wn}$ is not to contain the next step $X_{wn+1}$.

With the inventive system, it also becomes possible to produce, in an economical manner, crank webs of rectangular configuration. When speaking of rectangular crank webs, one is mainly considering those in which the external contour is to extend entirely or partly parallel to the middle axes. Here, instead of the numerous tangents fitted to the web configuration, there is present only one straight line which simultaneously forms both the milling profile and the tangent and it must be brought into coincidence with the path X of the milling carriage.

Figure 7A:
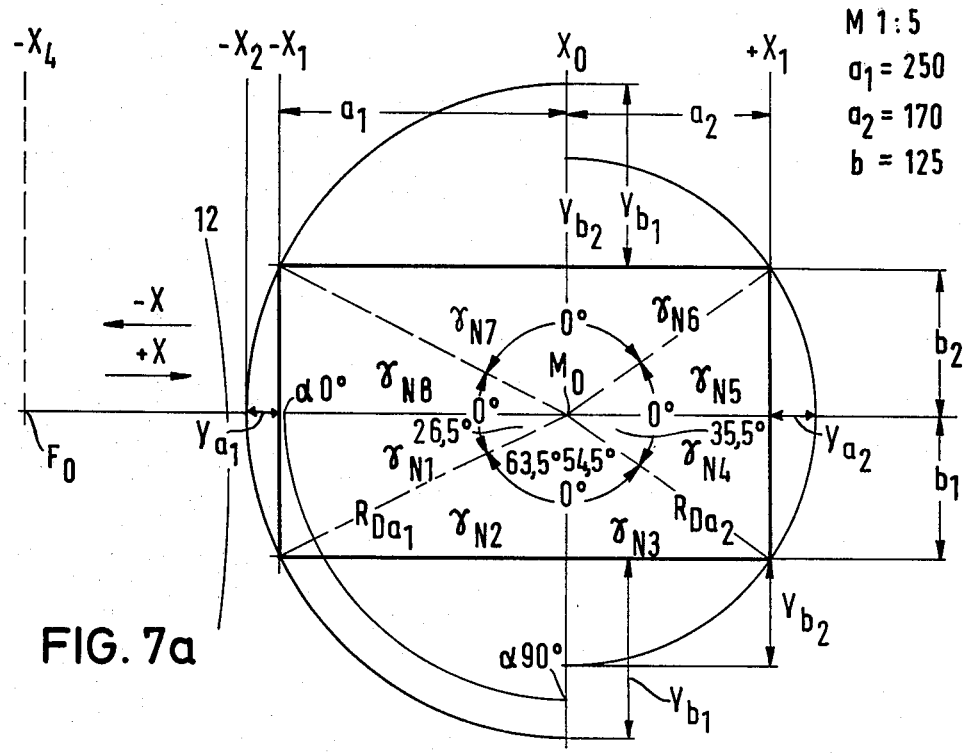
FIG. 7a depicts a rectangular crank web having a nominal angle $\gamma_N$ and spacings Y.
Figure 7B:
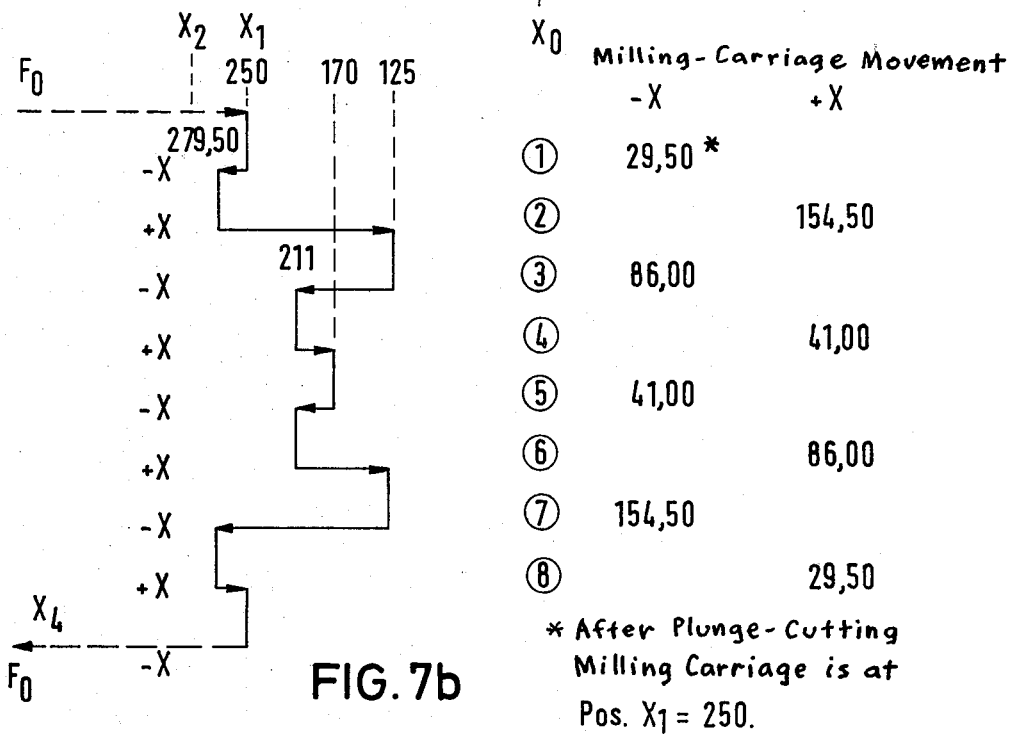
FIG. 7b depicts the milling-carriage distances corresponding to the spacings Y.

In FIGS. 7a and 7b there is illustrated the milling of a rectangular crank web. The middle axes $a_1$, $a_2$, b are given by the middle point of rotation $M_o$, it being assumed that all sides are to extend parallel to the middle axes.

The diagonal-radii $R_{Da1}$ ($a_2$) from the middle point of rotation $M_o$ of the crank web, are either marked off during the construction itself, or else are readily determined by computation from the values of the middle axes, as follows:

$$R_{Da1} = \sqrt{a_1^2 + b^2} \quad [20]$$

$$R_{Da2} = \sqrt{a_2^2 + b^2}$$

wherein, in the numerical examples which follow, the following values are assumed:
a₁: 250 mm
$a_1$: 250 mm
$a_2$: 170 mm
b: 125 mm
$R_F$: 500 mm.

In the various Figures, these values are indicated at differing scales.

The nominal angles included between the diagonals and the axes, which are consecutively denoted by $\gamma_{N1} - \gamma_{N8}$ in correspondence to the ongoing course of operation, are computed from the cosine values:

1. $\cos \gamma_{N1/8} = \dfrac{a_1}{R_{Da1}}$ from which, e.g., = 26.5°  90° Quadrants I/IV  [21]

2. $\cos \gamma_{N2/7} = \dfrac{b}{R_{Da1}}$ from which, e.g., = 63.5°

3. $\cos \gamma_{N3/6} = \dfrac{b}{R_{Da2}}$ from which, e.g., = 53.6°  90° Quadrants II/III 4. $\cos \gamma_{N4/5} = \dfrac{a_2}{R_{Da2}}$ from which, e.g., = 36.4°

The nominal angles $\gamma_N$ included between the diagonals and the axes of the workpiece each start at the respective axes, e.g., $\gamma_{N1}$ 0° at $a_1$, and their ends at the respective diagonals, e.g., 26.5° at $R_{Da1}$. At the diagonals, the angle abruptly assumes the difference relative to 90°, a value which now runs towards zero. The $\gamma$ values are therefore not equivalent to the rotation angle $\gamma$.

From the constructively determined or else computed diagonals $R_D$ one furthermore obtains the minimum distances Y to the axes and at the same time the minimum feed distances X 1. $Y_{a1} = R_{Da1} - a_1 = X_{1/8}$ e.g., 29.50 mm  [22]

2. $Y_{b1} = R_{Da1} - b = X_{2/7}$ 154.50 mm

3. $Y_{b2} = R_{Da2} - b = X_{3/6}$ 86.00 mm

4. $Y_{a2} = R_{Da2} - a_2 = X_{4/5}$ 41.00 mm

Figure 8:
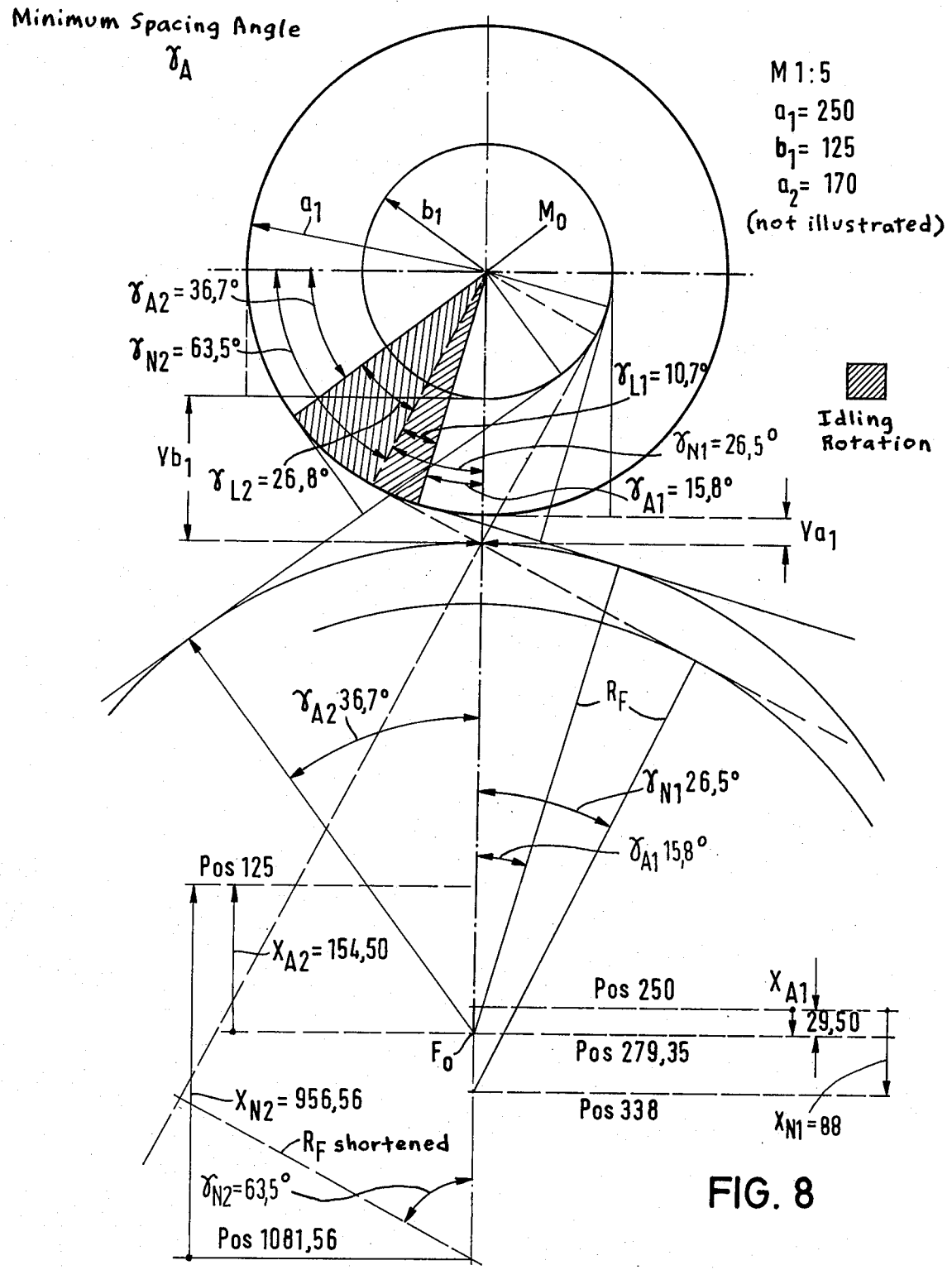
FIG. 8 depicts the rotary angle (spacing angle) $\gamma_A$ of the workpiece spindle corresponding to the spacings Y of the milling carriage 12.

Now, as can be seen from FIG. 8, the requisite milling distance, e.g., b, is finished milling considerably before reaching the end of the nominal angle $\gamma_{N1}$. If now the travel "around the corner" were likewise to proceed tangentially, the distance X would assume very large values.

For example, if the nominal angle $\gamma_{N1}$ (26.5°) were to be travelled entirely tangentially, then it would be necessary, instead of the distance $Y_{a1} = X_1$ of 29.35 mm, to travel a distance $X_1$ of 88 mm. However, in order that the travel be able to enter tangentially into the second nominal angle $\gamma_{N2} = 63.5°$, there would be necessary from Pos. 279.35 (FIG. 8) an auxiliary distance $X_2$ of 802.21 mm.

Therefore, according to a further concept of the invention, to produce rectangular crank webs, there is assumed as a maximum milling-carriage distance the distance $Y_{a1(a2)(b1)(b2)}$ between a middle axis, e.g., $a_1(a_2)$ (b), and the diagonals ($R_{Da1}$, $R_{Da2}$) of two rectangule-forming middle axes, the associated spacing angle $\gamma_A$ of the workpiece spindle C being computed from the formulas:

$$X_{RF a_1(a_2)(b_1)(b_2)} = \dfrac{R_F}{R_F + a_1(a_2)(b)} \cdot Y_{a_1(a_2)(b_1)(b_2)} \quad [23.1]$$

and $$\cos \gamma_{A a_1(a_2)(b_1)(b_2)} = \dfrac{R_F}{R_F + X_{RF a_1(a_2)(b_1)(b_2)}} \quad [23.2]$$

Furthermore, the positively guided motion of the milling carriage is discontinued after the traversal of each spacing angle (e.g., $\gamma_{A1}$), as a result of which the milling carriage is at standstill until the start of the next spacing angle (e.g., $\gamma_{A2}$), whereupon the positively guided motion of the milling carriage is reestablished, the workpiece spindle C turning at rapid speed during the time the milling carriage is thusly at standstill.

Even when the radii $b_1$ and $b_2$ are of equal length, their distances for the milling orbiting are nevertheless of different magnitude.

From the known values, there can be calculated, in accordance with formulas [23.1] and [23.2] above, the rotary angle of the workpiece associated with the minimum distance, this angle being called spacing angle $\gamma_A$.

By resort to a memorized tabulation, or the like, one can determine the angles expressed in degrees associated with the computed $\cos \gamma_A$, and also the functional values $\sin \gamma_A$ and $\tan \gamma_A$ associated therewith, which are needed for further computations.

Thus:

$\gamma_{Aa1} = \gamma_{A1}$ and $\gamma_{A8}$
$\gamma_{Aa2} = \gamma_{A4}$ and $\gamma_{A5}$
$\gamma_{Ab1} = \gamma_{A2}$ and $\gamma_{A7}$
$\gamma_{Ab2} = \gamma_{A3}$ and $\gamma_{A6}$  (see FIG. 7a)

In the example being presented, the results of such computations are as follows:

| Nominal Angle | Spacing Angle | Difference [24] |
|---|---|---|
| 1. $\gamma_{N1/8} = 26.5°$ — | $\gamma_{A1/8} = 15.8° =$ | 10.7° |
| 2. $\gamma_{N2/7} = 63.5°$ — | $\gamma_{A2/7} = 36.7° =$ | 26.8° |
| 3. $\gamma_{N3/6} = 54.5°$ — | $\gamma_{A3/6} = 28.5° =$ | 26.0° |
| 4. $\gamma_{N4/5} = 35.5°$ — | $\gamma_{A4/5} = 19.5° =$ | 16.0° |

The difference of these angles is the so-called idling-rotation angle $\gamma_L$, at which, in accordance with one feature of the invention, the workpiece rotates at an increased speed "around the corner" while the milling carriage is, as already explained, at a standstill; and specifically, each time by the amount of two difference, thus for example between the end of $\gamma_{A1}$ and the start of $\gamma_{A2}$ the idling-rotation angle is $10.7° + 26.8° = 37.5°$.

Any inaccuracy developing during the transition from high-speed rotation to the otherwise permissible normal-speed rotation (involving braking of the drive motor, etc.) and arising as the motion of the milling carriage resumes, is without effect because these transitional phenomena occur considerably before the miller again physically engages the workpiece. A position-monitoring and -regulating system described below serves to compensate such inaccuracies early enough that they not have any practical effect.

As is to be seen from FIG. 8, at the end of the spacing angle $\gamma_A$ the miller has travelled tangentially far past the edge of the workpiece. The angle which actually corresponds to the effective milling distance $X_F$, here called $\gamma_F$, computes to:

[25]

|  | $\gamma_F$ | $\gamma_A$ |
|---|---|---|
| 1. $\tan \gamma_{F1/8} = \dfrac{b}{a_1 + R_F} =$ | 9.50° | 15.8° |
| 2. $\tan \gamma_{F2/7} = \dfrac{a_1}{b + R_F} =$ | 21.80° | 36.7° |
| 3. $\tan \gamma_{F3/6} = \dfrac{a_2}{b + R_F} =$ | 15.6° | 28.5° |
| 4. $\tan \gamma_{F4/5} = \dfrac{b}{a_2 + R_F} =$ | 10.5° | 19.5° |

If in this numerical example one compares the angles $\gamma_F$ and $\gamma_A$, then it can be advantageous with regard to time, in accordance with a further feature of the invention, to set the workspeed into high-speed rotation (FIG. 9a) already after the completion of the milling angle $\gamma_F$ (expressed in whole-number degrees).

The interrelationship between workpiece rotation (angle $\alpha$) and the feed X of the milling carriage 12 is then discontinued, in accordance with a particular feature of the invention, after traversal of the angle $\gamma_{An}$. After running through the idling-rotation angle $\gamma_L$, at the beginning of the next angle $\gamma_{An+1}$ this interrelationship is reestablished, possibly with some reduction in the high-speed rotary speed, in order to switch over to the milling-rotation speed after a preestablished braking angle shortly prior to the start of the next milling angle $\gamma_{Fn+1}$ (expressed in degrees rounded off to a whole number). Meanwhile the position-monitoring action serves to compensate out any difference between $\alpha$ and X which might arise.

To ascertain the feed speed $V_{xw}$ and for the ongoing determination of the distance X of the milling carriage, the minimum distance Y must be resolved into constituent distances. To this end, in accordance with a further feature of the invention, the spacing angle $\gamma_A$, in whose range an interdependence between workpiece rotation and milling-carriage feed is positively enforced, is subdivided (FIG. 9b) into sections using a unit-angle $\gamma_E$ of for example 5°.

A small unit-angle $\gamma_E$ is important. Admittedly, there results for the first angle $\gamma_n = 1°$ only a distance X of 0.11 mm. However, the tangential milling distance Ta (FIG. 9a) already amounts to 11–13 mm, at each of sides $a_1$, $a_2$ or b (and at $\gamma_n = 5°$ amounts to the relationship Ta/X = 65.5/3). The constituent distance $X_n$ of the milling carriage, which depends upon the unit-angle $\gamma_{En}$, is, according to another feature of the invention, subdivided, by the intersection point of the middle line $M_o$–$F_o$ and the tangent to both circles with the radii $R_F$ and $a_1(a_2)(b)$, into the computable distances $\Delta X_{RFn}$ and $\Delta Y_n$ (see FIG. 9a, $X_1$ 16°).

The distance $\Delta X_{RFn}$ computes to (see FIG. 9a):

[26]

1. $f_n = (R_F \cdot \tan \gamma_{En}) \cdot \sin \gamma_{En} = R_F \cdot \dfrac{\sin^2 \gamma_{En}}{\cos \gamma_{En}}$ 2. $e_n = (R_F \cdot \cos \gamma_{En})$ 3. $f_n + e_n = R_F \left( \dfrac{\sin^2 \gamma_{En}}{\cos \gamma_{En}} + \cos \gamma_{En} \right) = R_F \cdot Z\,25_n$ 4. $(R_F \cdot Z\,25_n) - R_F = \Delta X_{RFn}$, with these values being correlated to the corresponding distance angles $\gamma_{A\,1-8}$.

Figure 9B:
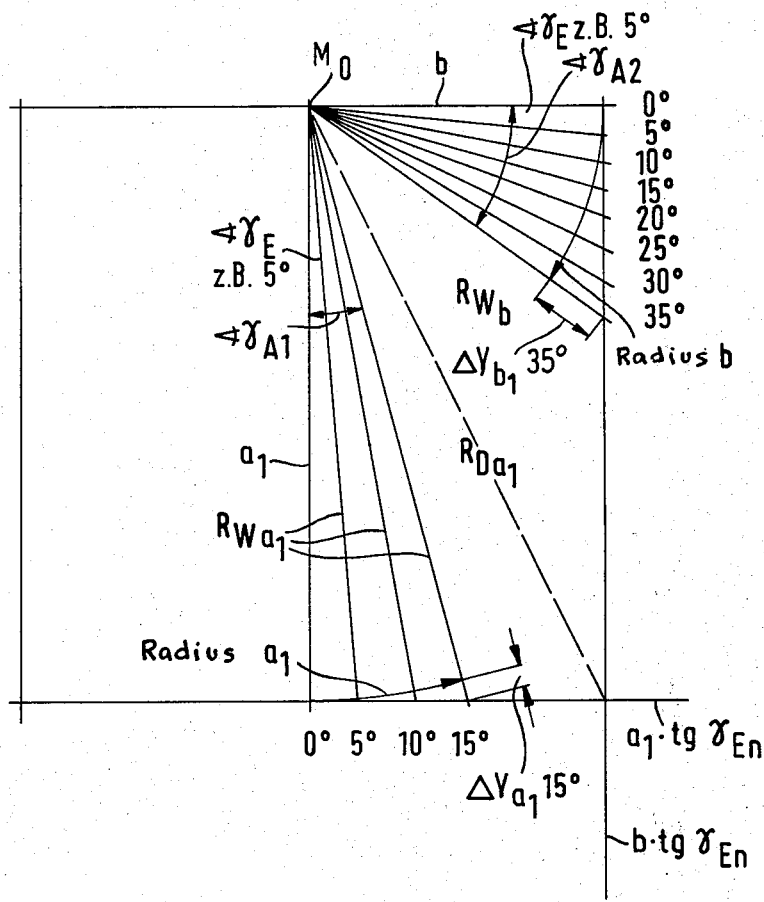
FIG. 9b depicts the form-radii $R_{wR}$ for the computation of the indexing spacings $\Delta Y$.

The distance $\Delta Y_n$ is computed in the computer RE5 with the help of the form radii $R_w$ as in FIG. 9b, these being located in the range of the distance angles $\gamma_{A\,1-8}$ each spaced from the next by the unit-angle $\gamma_E$, and furthermore with the help of the above computed functional expressions $Z\,25_n$, and in particular in accordance with the following formulas:

1. $Y_{a1}\,\gamma_{E1/8n} = R_{wa1}\,\gamma_{E1/8n} - a_1 = (a_1 \cdot Z25_n) - a_1$    [27]

2. $Y_{b1}\,\gamma_{E2/3n} = R_{wb1}\,\gamma_{E2/3n} - b = (b \cdot Z25_n) - b$

3. $Y_{a2}\,\gamma_{E4/5n} = R_{wa2}\,\gamma_{E4/5n} - a_2 = (a_2 \cdot Z25_n) - a_2$ 4. $Y_{b2}\,\gamma_{E6/7n} = R_{wb2}\,\gamma_{E6/7} - b = (b \cdot Z25_n) - b$ (see also claim 20).

The sum of the constituent distance values $\Delta X_n$ and $\Delta Y_n = X_n$ are correlated with the distance angles $\gamma_{A\,1-8}$. Additionally, the value $X_n$ must then be correlated, by means of computer RE5, to the rotary angle $\alpha$.

1. $\Delta X_{RFn} + \Delta Y_{a1}\gamma_{E1n} = X_{1n}\gamma_{0°\to\gamma_{A1}°} = X_{1n}(\alpha_{1n0°\to\alpha_{1n1}°})$    [28]

2. $\Delta X_{RFn} + \Delta Y_{b1}\gamma_{E2n} = X_{2n}\gamma_{A2\to\gamma_0°} = X_{2n}[\alpha_{2n2}° \to \alpha_{2n3}°(90°)]$ 3. $\Delta X_{RFn} + \Delta Y_{b1}\gamma_{E3n} = X_{3n}\gamma_{0°\to\gamma_{A3}} = X_{3n}(\alpha_{3n3}° \to \alpha_{3n4}°)$ 4. $\Delta X_{RFn} + \Delta Y_{a2}\gamma_{E4n} = X_{4n}\gamma_{A4\to\gamma_0°} = X_{4n}[\alpha_{4n5}° \to \alpha_{4n6}(180°)]$ 5. $\Delta X_{RFn} + \Delta Y_{a2}\gamma_{E5n} = X_{5n}\gamma_{0°\to\gamma_{A5}} = X_{5n}(\alpha_{5n6}° \to \alpha_{5n7}°)$ 6. $\Delta X_{RFn} + \Delta Y_{b2}\gamma_{E6n} = X_{6n}\gamma_{A6\to\gamma_0°} = X_{6n}[\alpha_{6n8}° \to \alpha_{6n9}°(270)]$ 7. $\Delta X_{RFn} + \Delta Y_{b2}\gamma_{E7n} = X_{7n}\gamma_{0°\to\gamma_{A7}} = X_{7n}(\alpha_{7n9}° \to \alpha_{7n10}°)$ 8. $\Delta X_{RFn} + \Delta Y_{a1}\gamma_{E8n} = X_{8n}\gamma_{A8\to\gamma_0°} = X_{8n}[\alpha_{8n11}° \to \alpha_{8n12}°(360)]$ FIG. 10a depicts that the manual input need only include the feeding in of data concerning the workpiece axes a, $a_2$, b and the unit angle $\gamma_E$. In many cases, the data of formulas [20], [21] and [22] are anyway already available because of the availability of a pictorial representation, but it is nevertheless preferred that these data be computed, in order that workpiece corrections or else special-configuration features (e.g., rounded-off corners) be more readily computable by means of special input data.

FIG. 10a summarizes the individual results of the computational operations described above with regard to formulas [20] through [28], which are necessary for the computation of all X or feed values.

From formulas [23.1] and [23.2] for $\cos \gamma_{AI-8}$, use is made of a memorized listing of trig-function values, or else use is made of auxiliary computational operations performed in an auxiliary computer RE5.1, to ascertain the values $\gamma_A$, $\sin \gamma$, and $\tan \gamma$, needed for the further computations.

After ascertaining the angles $\gamma_{Li-8}$ and $\gamma_{F1-8}$, the consecutive series of all values of all angles is established in the storage (computer) RE5.2 with position numbers (addresses) and furthermore provided with the value $\alpha$ of the rotary angle of the workpiece.

Furthermore, in the computer $RE_{5.2}$, there is added together a respective two successive idling-rotation angles, for example $\gamma_{L1} + \gamma_{L2} = \gamma_{L12}$ for each associated rotary angle $\gamma_L$, so that each associated rotary angle be issued by the computer accompanied by such additional angular data.

This computational procedure, and above all the organization of the storage, is here presented only for explanatory purposes and is of course, in the end, dependent upon the configuration of the hardware employed.

This comment applies above all to the program storage $Sp_{12}$, which has received from the computer $RE_5$ the data needed for the control of the machine (i.e., for the control of the workpiece spindle C and the milling carriage 12).

These data have, for storage addresses, a position number which remains the same so long as the sequence of operations to be performed is not changed. As a read-out address, the same position can be provided but in the case of differing workpiece with differing angle $\alpha$ values, which, via comparator $Comp._5$ and pulse counter $Zä_{11}$ of computer $RE_6$ (FIG. 10c) are compared (using clock $T_3$). When equality is reached, then the next position number or the next angle $\alpha$ value is read out, etc.

This form of storage is set forth only as an example. But with regard to it, the individual columns illustrated in FIG. 10b have the following significance:

| Program storage $Sp_{12}$: | |
|---|---|
| Column 1 = position number | = For each change of state of the drive C = workpiece spindle and F.S. 12 = milling carriage, a position number is set, e.g., for $C_E$, $C_{Vo}$, St, +, −, ×. Changes in the distances $X_n$ are positioned within a position by angle $\alpha$. |
| Column 2 = angle $\alpha$ | = To each value in columns 3–10, there is set the associated angle $\alpha$ value = the angular position of the workpiece spindle C in column 2. The $\alpha$ values can, for computational purposes, be set to whole-number degree values, because the exact interrelationship of angle $\alpha$ and distance X is assured due to the computation itself. After "Start" position 1 is entered into and $\alpha_{1.1}$ and $X_{1.1}$ issued as givens. In the computer $RE_6$ $\alpha_1$ is compared to the feedback value of $\alpha$(from $Imp._c$) and in the event of equality the next values, i.e., $\alpha_{1.2}$ and $X_{1.2}$ are read out. |
| Column 3 = $\gamma_F$<br>4 = $\gamma_A$<br>5 = $\gamma_L$ | = These values are indicated only for visual monitoring purposes. Their value is already transformed in the computer $RE_5$ into angle $\alpha$ values and therefore their effect is dependent upon the angle $\alpha$ value. If the actual milling distance sets in at $\gamma_F$, then, when once more approaching to the next $\gamma_F$ value, i.e., after rapid workpiece rotation, a changeover is to be effected, with an angular lead to be ascertained, from rapid rotation to normal-milling-speed rotation $V_{UF}$ (not indicated). |
| Column 6 = workpiece spindle C | = commands for the workpiece spindle's drive<br>$V_{UE}$ rapid rotation = $C_E$<br>$V_{UF}$ normal milling speed = $C_F$ |
| Column 7 = milling carriage 12 | = milling carriage commands<br>feed = X<br>standstill = St |
| Column 8 = $X_n$<br>Column 9 = $\alpha_{1/0°} - \alpha_{8n}°$ | = The X values are set in correspondence to the position of the milling carriage at the associated angle $\alpha$, ascertained by computer $RE_5$. Upon read-out, only the $X_n$ values accompanied by angle $\alpha$ values from 0°–360° are issued (column 2) and transmitted to the computer $RE_6$. |
| Column 10 = $\gamma_L$ | = Setting of the rapid-rotation values by means of the computer $RE_5$, e.g., $\alpha_{L12/34/56/78}$. |

Figure 10C:
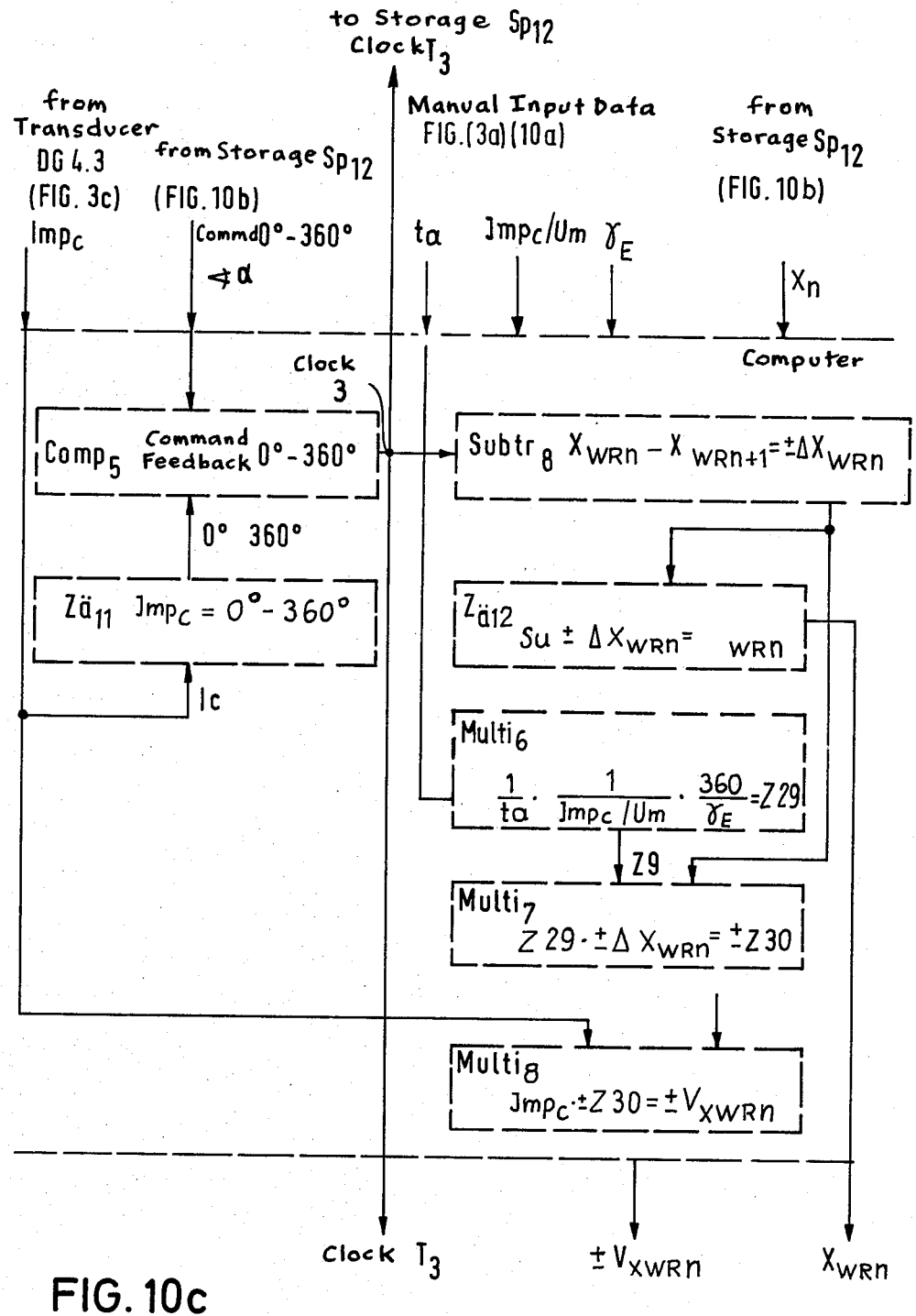
FIG. 10c depicts the computer $R_6$ for the automatic speed adjustment $V_{X_{wR}}$, for position $X_{wR}$.

The speed which is to be pregiven is not ascertained in the computer $RE_5$. Instead the $X_n$ values are transmitted from the program storage $Sp_{12}$ into the computer $RE_6$, and in subtractor $Subtr._8$ from $X_{n+1} - X_n$ there is formed the difference $\pm \Delta X_{n+1}$, and then from that there is computed the speed and direction for the milling carriage in accordance with formula [29] similarly to formula [16] (FIG. 10c)

$$\pm V_{XwR} = n_c/\min \cdot \frac{360}{\gamma_E} \cdot \pm \Delta X_n \text{ mm/min} \qquad [29]$$

With the use of pulses $Imp_c$ from the workpiece-spindle transducer, i.e., instead of a simple rpm signal, similarly to formula [17], the formula $$\pm V_{XwR} = Imp_c \cdot \frac{1}{ta} \cdot \frac{1}{Imp_c/rot.} \cdot \frac{360}{\gamma_E} \cdot \pm \Delta X_{n+1} \text{ mm/s.} \qquad [30]$$

The difference relative to the earlier formulas resides in the difference angle, which in formulas [16] and [17] has differing values, whereas in formulas [29] and [30] the unit-angle $\gamma_E$ can be utilized. From $$\frac{1}{ta} \cdot \frac{1}{Imp_c/\text{rotation}} \cdot \frac{360}{\gamma_E},$$

it once more becomes possible to compute in advance an intermediate expression Z29, which is multiplied with the difference value $\pm \Delta X_n$ from the subtractor $Subtr._8$ of computer $RE_6$ and controlled with the clocking rate $T_3$.

This intermediate expression Z29 from $Multi_6$, multiplied at clocking rate $T_3$ with the $\pm \Delta X_{wRn}$ values from the counter $Zä_{12}$, yields the expression Z30, an expression which is to be computed in advance. The sum $\pm Z30$ of this preliminary computation is now multiplied with the ongoing pulse count derived from the pulses $Imp_c$, the multiplication being performed with the clocking rate of clock signal ta, and this yields the milling-carriage speed command:

$$\pm V_{XwR} = Imp_c \cdot \pm Z30. \qquad [33]$$

This value is transmitted to the drive and regulating system for the milling carriage (FIG. 3c) together with the values $X_{wRn}$ and the clock $T_3$ via electronically controlled changeover or routing switches, instead of the values $V_{Xw}$, $X_w$, $T_2$ (computer RE4) or instead of the values $V_X$, $X$, $T_1$ (computers RE1 and RE2) as the case may be.

The speed $V_{XwR}$ increases with increasing work angle. Accordingly, for this reason too, it is advantageous to feed the miller only until the end of each angle $\gamma_A$. At $\gamma_E = 1°$, and with a constant rotary speed of the workpiece spindle C of n=0.1 rpm, there results for the numerical workpiece example under discussion, the following values:

| Milling Angle | = | $\Delta X_{wR}$ mm | = | $V_{XwR}$ mm/s | |
|---|---|---|---|---|---|
| $\gamma_{A1/8}$ 1°–15.8° | = | 0.27 – 3.01 | = | 0.162 – 2.25 | 1:14 |
| $\gamma_{A2/7}$ 1°–36.7° | = | 0.25 – 7.10 | = | 0.15 – 6.04 | 1:40 |
| $\gamma_{A3/6}$ 1°–27.6° | = | 0.26 – 4.07 | = | 0.156 – 4.07 | 1:26 |
| $\gamma_{A4/5}$ 1°–19.5° | = | 0.26 – 2.22 | = | 0.156 – 2.66 | 1:17 |
| $\gamma_{N2}$ 1°–63.5° | = | 0.25 – 23.26 | = | 0.15 – 27.91 | 1:186 |

The tangential milling is performed over the entire milling angle up to $\gamma_A = 45°$ with a constant speed $V_{TA}$. With the numerical example presented above, this would yield a speed minimum of 6.54 mm/s at $\gamma_n = 1°$ and 10.73 mm/s at $\gamma_n = 36.7°$. The tangential speed is thus immediately high, in contrast to the $V_x$ speed of feed of the milling carriage. This is to be taken into account when establishing the rotary speed $V_u$ for the workpiece spindle. In the numerical example presented above, $V_u$ amounted to only 0.1 rpm.

A few further special features to which resort can be had when milling rectangular crank webs:

1. bevelling the edges = arcs of circles with shortened radii $R_{Da1(a2)}$.

2. rounding off the edges utilizing arcs of centric circles of radius r = transforming the radius r onto the rotation point $M_o$ of the crank web, as in the milling of oval crank webs.

3. Crank webs having a circular profile at one or both of their short sides b, of arbitrary radius, which are possibly to be transformed onto the rotation point $M_o$.

4. Crank webs comprised of straight lines which are not parallel to the middle axis. Their angle relative to the corresponding middle axis is added to or subtracted from the work angle $\gamma_{Fn}$ or $\gamma_{An}$, as the case may be.

5. If the milling carriage is always to be kept positively interrelated with the rotation of the workpiece during one rotation of the workpiece, without obtaining very long feed distances in the case of tangential milling, then one would have to switch over the computation of the feed distance X to that employed for the milling of crank pins, similarly to formula [2], at the moment at which the tangential milling of one side of the rectangle has just been finished (e.g., the side $a_{2.1}$), i.e., after traversal of, e.g., the angle $\gamma_{F3}$.

The computer RE6, as well as the computers RE1 to RE5 already discussed, are depicted and discussed as discrete computers, to facilitate explanation of computational operations. It could equally well be, of course, that they would all be subsumed within a single computer, whose memory would subsume the storages Sp6, Sp7, Sp12. This remark applies especially to the computers RE4 and RE6.

It is advantageous to perform many, most or all of the computational operations involved using a single minicomputer (central computer), but utilizing another such minicomputer to redundantly perform the same operations, so that the results being produced by the two minicomputers can be continually compared. If discrepancies arise, not only is the fact of malfunction detected, and for example audibly or visually indicated, but in addition it then becomes a simple matter to resort to trouble-shooting programs to furthermore provide an indication of the exact source of the malfunction.

The number of input data required for the various operating steps for the crank pins and webs is not large. Such input data can be, quite practically, fed into the computer using manually set decade switches or fed into an input storage using tape.

Using an operating-mode selector switch, one then effects the read-out of only that data required for the particular milling operation to be performed, and simultaneously the corresponding computer program is activated.

Besides the data for displacement, indexing, and plunge cutting, there are also necessary in general: $R_F$, $Imp_c$/rotation, and dt (ta).

| | | |
|---|---|---|
| (1) | crank pins, short way | 0°, H, $R_Z$, $\alpha$ |
| (2) | crank pins, long way | 180°, H, $R_Z$, $\alpha$ |
| (3) | webs, oval, simultaneously | $R_1$, $R_2$, $a_1$, $\alpha_E$, $a_1$, b, c |
| (4) | webs, pear-shaped | $R_1$, $R_2$, $R_3$, $\alpha_E$, $\alpha_1$, $\alpha_3$, $a_1$, $a_2$, b, c |
| (5) | webs, rectangular | $a_1$, $a_2$, b, $E$ |
| (6) | webs, rectangular but with circular arcs | $a_1$, $a_2$, b, $\tau_E$, $R_{Bo1}$ ($R_{Bo2}$). |

The selected data should have values in excess of zero.

It will be understood that each of the elements described above, or two or more together, may also find a useful application in other types of circuits, constructions and machining procedures differing from the types described above.

While the invention has been illustrated and described as embodied in a particular crankshaft-milling machine and control-system therefor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Electric numerical program control for crankshaft milling machines and crankshaft grinding machines with the following characteristics:
    (a) a milling slide which is movable in a plane at right angles to the axis of the crankshaft,
    (b) a workpiece spindle which can be rotated and is connected to a rotary digital transducer in a stationary manner which transmits pulses in relation to the rotary movement,
    (c) a computer associated with the milling slide in which predetermined, selectable operating programs are stored for crank pins, oval/rectangular webs and mixed forms of the latter,
    (d) means for entering and storing in the computer drawing and/or design data for pins and webs and their mixed forms as well as the cutter radius $R_F$ and a uniform angle calculation increment for the rotation of the workpiece, (e) means for inputting into the computer the pulses generated by the rotary digital transducer mounted on the workpiece spindle, (f) means incorporated in the computer for calculating and storing the position values $x_n$ required for the milling slide from the predetermined, the entered and the input values for the purpose of machining crank pins according to the known formula for crank assemblies, for curved and straight circumferential profiles from form radii Ru and their angular positions calculated in the computer, means for output for these values for the purpose of calculating a sign digit adapted to the angular increment and means for storage of these sign digits, (g) multipliers incorporated in the computer for multiplying the sign digits by the number of pulses received in the predetermined time increments ta during the process, whereby the feed rate for the next angular increment is determined, which is converted into the guide voltage for the milling slide.

2. Program control according to claim 1 with the following characteristics:

(a) a counter incorporated in the computer for determination of the speed control signal for counting the pulses put out to the computer by the rotary digital transducer mounted on the workpiece spindle, (b) a timing element associated with the computer for determination of the pulses put out to the computer by the counter and to be counted in the shortest possible time increments, (c) means incorporated in the computer for calculation and storage of the speed control signal taking the following factors into consideration:
  1. number of the pulses put out of the rotary digital transducer per rotation ($Imp_c/U$)
  2. value of the unit angle ($\gamma_E$) for the workpiece spindle (C),
  3. Feed path $\Delta X_n$ for the milling slide (12), pre-computed in computer (RE) to correspond to the unit angle ($\gamma_E$) and its position in the circumference, (d) the factors 1., 2., 3. together result in the formula $$V_{Xn} = Imp_{c(ta)} \cdot \left( \frac{1}{ta} \cdot \frac{1^1}{Imp_c/U} \cdot \frac{360}{E} \cdot \pm \Delta x_n \right)$$

whereby the contents of the parenthesis are precalculated and stored as an (sign digit) index which is continuously multiplied during the process by the number of pulses per time increment $$(V_{Xn} = Imp_{c(ta)} \cdot Z_{10\ n})$$

and therefore prescribes the feed rates for the next time increment.

3. Program control according to claim 2 with the following characteristics:

(a) means for adjustment of the timing pulse (ta), by which the multiplication of the timing pulse within one angular increment is repeated often enough that the dynamics of the workpiece spindle (C) are determined to the desired degree of accuracy and that the timing pulse and/or the number of pulses per rotation of the rotary digital transducer (DGC 4.3) are measured so that at least one pulse is picked up per time pulse, (b) adder incorporated in the computer for automatic addition (sum ta) of the set unit timing pulse (ta), e.g. 0.01, until a pulse ($Imp_c$) from the pick-up on the workpiece spindle (C) arrives at an AND-gate and means by which the product of (sum ta/ta) is inserted into the calculation as the divisor according to claim 2.

4. Program control according to claim 1 for calculation of the operating processes for the webs milling with profiles consisting of curves with the following characteristics:

(a) a grid of designed form radii ($R_w$) (FIG. 4a) beginning at the long middle axis (a) and from the rotational point of the cheek ($M_0$), in each case at an interval of one unit angle ($\gamma_E$), or (b) means for input of the drawing data for the workpiece with profiles consisting circular curves: ($\gamma_E$, $\gamma_1$, $\gamma_3$, $R_1$, $R_2$, $R_3$, $a_1$, $a_2$, $b,c$) into the computer (RE3) (FIG. 6a), whereby the calculated form radii ($R_w$) and difference angle ($\gamma_{6n}$) are determined in relation to the profile line by the computer and the intersection point of the radii ($R_w$) with the profile lines of the oval produce the contact points of the cutter profile, (c) calculation of the third side ($c_1$) (FIG. 5) of an auxiliary triangle by the computer RE3 (FIG. 6a) from the radii ($R_w$) ($a_1$ and $b_1$) adjacent to the contact radius and the angle ($\gamma_1$) whereby the side ($c_1$) runs parallel to the tangent at the contact point and therefore the angle ($\beta_2$) of the contact radius to the tangent is calculated, allowing determination of the position of the cutter middle ($F_o$) to the webs middle ($M_0$) with the aid of the second triangle ($a_2$, $b_2$, $c_2$), (d) calculation of the radius sought $R_{Tn}$ ($b_2$-$R_F$) and its circumferential angle 3 by computer RE4 (FIG. 6b) whereby a subtractor incorporated in the computer calculates the position values ($\Delta_x$) by simple subtraction ($R_{Tn}-R_{Tn+1}$) while the speed control signals $VX_{wn}$ are obtained by simple multiplication of the sign digits $Z_{20n}$ precalculated according to claim 2 by the computer, (e) means for transferring the precalculated values to the central control unit (FIG. 3c).

5. Program control according to claim 1, machining of rectangular cheeks with the following characteristics:

(a) means for determination of the maximum path of the milling slide (12) corresponding to the distance $Y_{a1}$ ($a_2$) ($b_1$) ($b_2$) the difference between the centre axis, e.g. $a_1$ and the diagonals ($RD_{a1}$) (FIG. 7), after input of the drawing data of the rectangle to be machined, (b) the associated distance angle ($\gamma_A$) (FIG. 9a) of the workpiece spindle (C) is calculated in the computer (FIG. 10a) from the ratio: cutter radius ($R_F$) to the sum of the cutter radius ($R_F$) plus its spacing percentage $X_{RFa1}$ to $$\cos \gamma = \frac{R_F}{R_F + X_{RFa1}(a_2)\ (b_2)\ (c_2)}$$

(c) the value $X_{RXFa1}$ is calculated in computer RE5 (FIG. 10a) from the ratio of the cutter radius $R_F$ to the sum $R_F$ plus the path of a centre axis, e.g. $a_1$, by an adder/divider operated in computer $R_{E5}$ and by multiplication by the associated minimum distance $Y_{a1}$, so that the following formula applies, e.g.

$$X_{RFa1} = \frac{R_F}{R_F + a_1} \cdot Y_{a1}$$

(d) means for neutralizing the positive locking of the milling slide (12) with the rotation of the workpiece spindle ($C_4$) in each case after completion of a distance angle, e.g. $\gamma_{A1}$ (FIG. 8) whereby the milling slide (12) does not move up to the beginning of the next distance angle, e.g. $\gamma_{A2}$ whereby workpiece spindle (C) turns in rapid motion, (e) means for restoring the positive locking of the milling slide with the spindle c.

6. Program control according to claim 5 with the following characterisitcs:
  (a) means for subdividing the distance angle ($\gamma_A$) by a unit angle ($\gamma_E$), e.g. 1°, with radii ($R_{wa/b}$) (FIG. 9b) whereby this subdivision serves for determination for the path (X) of the milling slide (12) and therefore for continuous determination of a feed rate ($V_{xn}$),
  (b) means for calculating the feed path ($X_n$), whereby the point of intersection of the centre line ($M_o \rightarrow F_o$) (FIG. 9a) with the tangents (Ta) of the two circles with radii of cutter $R_F$ and one centre axis e.g. $a_1$, divides up the spacing of the two circles (feed paths) into partial paths ($\Delta X_{RF} + \Delta X_{a1n}$) which can be calculated and which are precalculated and stored by computer ($RE_{51}$) (FIG. 10a) using the formulas $$\Delta X_{RF} = R_F \cdot \frac{(\sin\gamma_{En} + \cos\gamma_{En})}{\cos\gamma_{En}} - R_F$$

$$\Delta X_{a1n} = a_1 \cdot \frac{(\sin^2\gamma_{En} + \cos\gamma_{En})}{\cos\gamma_{En}} - a_1$$

wherein coefficients ($Z_{25n}$) are formed for the contents of the parenthesis which do not change for a given value for the unit angle ($\gamma_E$) so that the values can be calculated by simple multiplication and division, e.g.

$$X_{a1n} = a_1 \cdot Z_{25n} - a_1,$$

(c) wherein the values $x_n$ are with the aid of the sum $X_{RF} + x_{a1n}$ for each sum $\gamma_{En}$ for the unit angle and so stored,
(d) means incorporated in computer $RE_{5.2}$ in which this drawing data $a_1$, $a_2$, $b_1$, $b_2$, $\gamma_F$, $R_F$ is entered for determination of all required workpiece angles ($\gamma_F$, $\gamma_A$, $\gamma_L$) with the associated angle of rotation $\beta_n$ for the workpiece spindle (C) and paths $X_{1-8n}$ and a program memory (FIG. 10a) for storage of the values,
(e) means for feeding the data calculated according to b/d during operation to the computer $RE_6$ (FIG. 10c) and means for continuous precalculation of the position values $X_n$ with the aid or the pregiven data in computer $RE_6$ (ta, $Imp_c$ U, Imp/ta) and multipliers incorporated in computer $RE_6$ for determination of the speed control signals $V_{XwRw}$ using precalculated coefficients $Z_{30n}$ according to claim 2 and means for feeding these values to a central control (FIG. 3c).

* * * * *